(12) United States Patent
Wahl et al.

(10) Patent No.: US 7,562,250 B2
(45) Date of Patent: Jul. 14, 2009

(54) RESOURCE ALLOCATION THROTTLING IN REMOTE DATA MIRRORING SYSTEM

(75) Inventors: Steven B. Wahl, Golden, CO (US); Michael W. Losh, Niwot, CO (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 11/488,907

(22) Filed: Jul. 17, 2006

(65) Prior Publication Data

US 2007/0028139 A1 Feb. 1, 2007

Related U.S. Application Data

(60) Continuation of application No. 10/613,114, filed on Jul. 3, 2003, now Pat. No. 7,103,797, which is a continuation of application No. 10/225,916, filed on Aug. 22, 2002, now Pat. No. 6,618,818, which is a continuation of application No. 09/702,187, filed on Oct. 30, 2000, now Pat. No. 6,442,706, which is a division of application No. 09/050,676, filed on Mar. 30, 1998, now Pat. No. 6,324,654.

(51) Int. Cl.
*G06F 11/00* (2006.01)

(52) U.S. Cl. .................................... 714/6; 711/162

(58) Field of Classification Search ............... 711/161, 711/162; 714/6

See application file for complete search history.

(56) References Cited

U.S. PATENT DOCUMENTS

| 4,654,819 | A | * | 3/1987 | Stiffler et al. | 711/162 |
|---|---|---|---|---|---|
| 5,263,154 | A | * | 11/1993 | Eastridge et al. | 714/6 |
| 5,933,653 | A | * | 8/1999 | Ofek | 710/6 |
| 6,052,797 | A | * | 4/2000 | Ofek et al. | 714/6 |

* cited by examiner

*Primary Examiner*—Michael C Maskulinski
(74) *Attorney, Agent, or Firm*—Van Pelt, Yi & James LLP

(57) ABSTRACT

A computer network remote data mirroring system writes update data both to a local data device and to a local, chronologically sequenced journal storage area, or writelog device. A graphical user interface enables a user to create and configure throttles, which are user-defined tests and actions evaluated by the primary mirror daemon to regulate network bandwidth, CPU, and writelog device utilization during data update mirroring. Network bandwidth throttling enables a predetermined portion of the network bandwidth to be assigned to remote data mirroring based on user-selected criteria. CPU throttling enables a user to control the amount of time the local data storage unit will wait prior to returning control to applications after an update. Writelog device throttling prevents a memory overflow condition by dynamically assigning memory to the writelog device by chaining writelog device extensions to the writelog device.

21 Claims, 12 Drawing Sheets

```
THROTTLE 08:00:00 18:00:00 netkbps T>= 200
ACTIONLIST
    ACTION: set sleep 15000
    ACTION: do console Net traffic exceeded 200KBps (now %%KBPS%%KBps)
    ACTION: do console Slowing PMDs for logical group %%GROUPNO%% (sleep now %%SLEEP%%ms)
    ACTION: do mail root Net traffic exceeded 200KBps (now %%KBPS%%KBps, sleep now %%SLEEP%% usecs)
    ACTION: do exec /home/dave/bin/wally Net traffic exceeded 200KBps (now %%KBPS%%KBps, sleep now %%SLEEP%% usecs)
ENDACTIONLIST THROTTLE 08:00:00 18:00:00 netkbps > 300
ACTIONLIST
    ACTION: incr sleep 5000
    ACTION: do console Net traffic high (%%KBPS%%KBps)
    ACTION: do console Slowing PMDs for logical group %%GROUPNO%% (sleep now %%SLEEP%% usecs)
    ACTION: do mail root Net traffic high: now %%KBPS%%KBps, (sleep now %%SLEEP%% usecs)
ENDACTIONLIST THROTTLE 08:00:00 18:30:00 netkbps T < 175
ACTIONLIST
    ACTION: decr sleep 5000
    ACTION: do console Net traffic slowing. Now %%KBPS%%KBps
    ACTION: do console Speeding up PMDs for logical group %%GROUPNO%% (sleep now %%SLEEP%% usecs)
    ACTION: do mail root Net traffic slowing. Now %%KBPS%%KBps, (sleep now %%SLEEP%% usecs)
ENDACTIONLIST THROTTLE 08:00:00 18:00:00 netkbps < 150
ACTIONLIST
    ACTION: decr sleep 15000
    ACTION: do console Net traffic low (%%KBPS%%KBps). Sleep set to %%SLEEP%% usecs
ENDACTIONLIST THROTTLE 18:31:00 23:59:59 netkbps < 500
ACTIONLIST
    ACTION: set sleep 0
ENDACTIONLIST THROTTLE 00:00:00 07:59:59 netkbps < 500
ACTIONLIST
    ACTION: set sleep 0
ENDACTIONLIST
```

Figure 10

Entries Placed in WriteLog:

| ADDRESS: | Block 1 | Block 2 | Block 1 | Block 3 |
|---|---|---|---|---|
| DATA: | $10,000 | Current Salary is "Block 1" | ("Block 1"x1.07) $10,700 | Salary after Raise is "Block 1" |
| TIME: | 01:01 | 01:02 | 01:03 | 01:04 |

What is written to the mirror disk?

Chronologic Coherency Method:

Block 1: $10,000
Block 2: Current Salary is "Block 1"
Block 1: $10,700
Block 3: Salary after Raise is "Block 1"

Read from Data Disk Method:

Block 1: $10,700
Block 2: Current Salary is "Block 1"
Block 1: $10,700
Block 3: Salary after Raise is "Block 1"

Figure 11

RESOURCE ALLOCATION THROTTLING IN REMOTE DATA MIRRORING SYSTEM

RELATED APPLICATION

"This is a Continuation of application Ser. No. 10/613,114, filed Jul. 3, 2003 now U.S. Pat. No. 7,103,797, which is a continuation of prior application Ser. No. 10/225,916, filed Aug. 22, 2002, now U.S. Pat. No. 6,618,818, which is a continuation of prior application Ser. No. 09/702,187, filed Oct. 30, 2000, now U.S. Pat. No. 6,442,706, which is a continuation of prior application Ser. No. 09/050,676, filed Mar. 30, 1998, now U.S. Pat. No. 6,324,654, which is hereby incorporated by reference."

BACKGROUND OF THE INVENTION

1. Field of the Invention

The present invention relates to computer hardware and software systems and, more particularly, to recovery or restoration of data for such a system in the event of a crash of the system or a disaster which causes the system to become inoperative for a period of time. When such a system crashes or becomes inoperative, data may be lost unless measures have been provided to recover or restore data. Specifically, the present invention provides methods and apparatus which implement substantially real-time networked disk, or data, mirroring over local area networks (LANs) and wide area networks (WANs) in a computer system, such as a SPARC Solaris 2.X environment, for disaster recovery and other applications.

2. Related Art

Various techniques are known for recovery or restoration of data in the event of a crash of a computer system or a disaster which causes the computer system to become inoperative for an indefinite period of time or even permanently. One technique that is known is to replicate data as the data is generated by an application program being executed by the computer system. This technique is typically referred to as disk, or data, mirroring.

Heretofore, data mirroring has been achieved by one of several approaches. One approach is to provide local data mirroring utilizing redundant arrays of independent disks (RAID). Using the RAID approach, data generated by execution of an application program is written to multiple storage devices, such as conventional disk drive devices, contemporaneously with storage of the data on a local input/output (I/O) data storage device. Another approach is to provide volume management software and a redundant storage device on which data is replicated. The volume management software replicates data on the redundant storage device contemporaneously with storage of the data on the local I/O data storage device. Both of these approaches typically provide synchronous data mirroring and are characterized by miniscule delay in the replication of data for system recovery.

Considered in more detail, both RAID and volume management approaches typically provide synchronous versus asynchronous disk mirroring. In a synchronous disk mirroring architecture, such as provided by a RAID or volume management approach, disk updates are committed to each of the disk devices in the mirror before control is returned to the application program. In the event that one of the disks goes out of service, the data is still available on one of the other disk devices in the mirror.

The RAID and volume management approaches can be implemented to protect data locally. While these approaches are satisfactory for local disk mirroring for data recovery in the event of a local I/O disk failure or temporary system crash, they do not address the problem of catastrophic system failure or disaster which renders the computer system inoperative for an extended period of time or even permanently. A1

Another approach is to provide remote data mirroring in addition to local data mirroring. Using this approach, a remote data mirroring system is implemented both locally and remotely so that data generated locally by execution of an application program is additionally communicated over a network to a remote location for replication. Typically, remote data mirroring enables recovery of the local computer system in the event of a temporary outage or, alternatively, transfer of data processing operations to a remote computer system if the local computer system is not able to recover, the outage is for a prolonged period of time, or a disaster permanently disables the local computer system. Remote data mirroring systems have been commercialized by companies such as International Business Machines, Digital Equipment Corporation, and Data General Corporation in the past. Such remote data mirroring systems are operable in one of several modes, including a synchronous mode, asynchronous mode, and near synchronous mode.

Unfortunately, implementing synchronous data mirroring over a network raises serious performance problems. Rather than working with local data channels that can accept data at 5, 20, or 40 megabytes (MB) per second or higher, the data must travel over a much lower bandwidth channel, stretching out data transfer times. Network latencies pile up on top of the much lower bandwidth, further slowing I/O turnaround times. Any practical experience with an I/O rich application program that has compared network file system (NFS) update performance over local disk performance readily illustrates this point. If networked disk mirroring is implemented using synchronous I/O techniques, application performance is tremendously degraded.

On the other hand, implementing asynchronous disk mirroring over a network raises data integrity problems. In the event of a disaster, the data on the remote, or secondary, computer system may be up to several seconds older than what would be found on the local, or primary, computer system.

The near synchronous mode is a forced compromise between the synchronous and asynchronous modes. Near synchronous data mirroring provides asynchronous remote data mirroring at a preset interval, but requires the local computer system to periodically halt execution of the application program at the preset interval until data replication by the remote computer system is acknowledged.

Therefore, a remote data mirroring system which comprises an architecture configured for optimal data mirroring is needed. Furthermore, such a system is needed which addresses the problem of the limited bandwidth of a network for communication for data over the network.

SUMMARY OF THE INVENTION

The present invention provides methods and apparatus for a novel synchronous, asynchronous, or near synchronous computer system remote disk, or data, mirroring system over a network. Fundamentally, the computer network remote data mirroring system in accordance with the present invention comprises an architecture to perform a data update both to a local data device and to a local, chronologically sequenced journal storage area, or writelog device. In one embodiment, the writelog device comprises a redundant data storage device, such as a disk drive device. In another embodiment, the writelog device comprises cache memory and a dirty bit map disk drive device to which data can be written from the cache memory to avoid a memory overflow condition. Advantageously, the device driver for the local data device and the writelog device is layered on top of the operating system environment, so that the computer network remote data mirroring system of the present invention ports to many commercially available computer systems. Once written to the local data device and the writelog device, I/O operation returns control to the application. This delivers to the application I/O performance comparable to simple local disk mirroring data mirroring system of the present invention ports to many commercially available computer systems.

Once written to the local data device and the writelog device, I/O operation returns control to the application. This delivers to the application I/O performance comparable to simple local disk mirroring.

A primary mirror daemon on the local, or primary, computer system monitors the writelog device for data updates and feeds the data over a network in the same order in which it is stored to a receiving remote mirror daemon on a remote, or secondary, computer system, which in turn commits the data updates to a mirror device. Advantageously, the computer network remote data mirroring system in accordance with the present invention operates over different network configurations and is compatible with many different local and remote disk storage devices.

In accordance with the present invention, the writelog device is configured so that more memory space is dynamically assigned to the writing device to prevent a memory overflow condition which might otherwise corrupt stored data. In the embodiment in which the writelog device comprises a disk drive device, additional disk storage is dynamically assigned or another disk storage device is chained into the local, or primary, computer system. In the embodiment in which the writelog device comprises cache memory and a dirty bit map disk drive device, additional disk storage is dynamically assigned or another disk drive is chained into the local, or primary, computer system to prevent memory overflow.

Also in accordance with the present invention, the computer network remote data mirroring system can be structured to provide volume grouping, or logical groups. Consequently, data at the local, or primary, site can be replicated at a plurality of remote sites, as compared to known architectures which provide point-to-point (local to a single remote site) data mirroring. Accordingly, the computer network remote data mirroring system of the present invention provides a master primary mirror daemon and associated child primary mirror daemons, as well as a master remote mirror daemon and associated remote mirror daemons, to process data for replication. A graphical user interface is preferably provided by the computer network remote data mirroring system in accordance with the present invention for confirming the logical groups, as well as for monitoring performance of the remote data mirroring system.

The computer network remote data mirroring system of the present invention additionally provides network bandwidth throttling. Bandwidth throttling enables a predetermined portion of the network bandwidth to be assigned to remote data mirroring depending on the time of day or other criteria.

In accordance with the present invention, a method is provided for ensuring data integrity through a systems failure while updates are occurring in parallel to two data storage devices, such as disk drive devices, simultaneously. The disks are simultaneously updated through a device driver. Preferably, each disk is provided with a disk interface, such as a SCSI interface, to enhance reliability and speed of data updates. Consequently, data is written and thus stored substantially simultaneously on both the local data device and in the writelog device. The method in accordance with the present invention accommodates any of three conditions that may arise in the event of a system crash. The first condition is that the same update data has been stored on both the local data device and in the writelog device; the second condition is that the update data was stored on the local data device, but failed to be stored in the writelog device; and the third condition is that the update data was written to the writelog device, but failed to be stored on the local data device. In accordance with the method of the present invention, the current update data is written to the writelog device, while the immediately preceding update is written to the local data device. If the local computer system crashes, upon recovery or re-boot of the computer system, the two most current updates in the writelog device are written to the local data device to assure that the data stored on the local data device is current.

Additionally, in accordance with the present invention, failure recovery with the primary and remote mirror daemons is initiated automatically for certain failures which do not affect the basic operability of the overall computer system. For example, the computer network remote data mirroring system in accordance with the present invention is automatically recovered upon power shutoff of one of the local, or primary, and remote, or secondary, computer systems or temporary loss of the network link, Preferably, the computer network remote data mirroring system of the present invention operates in an asynchronous mode. Consequently, the primary and remote mirror daemons are able to take advantage of the entire network bandwidth during data transfers, as one would find in a synchronous mode, yet this is performed independently of the application. One drawback is that in the event of a disaster, the data on the secondary computer system may be up to several seconds older than what would be found on the primary computer system. However, this trade-off between application performance and data synchronicity presents the optimal compromise available between the two requirements. Alternatively, the computer network remote data mirroring system in accordance with the present invention can be operated in a synchronous mode to better assure data synchronicity at the expense of application performance. The computer network remote data mirroring system of the present invention also can alternatively be operated in a near synchronous mode to enable adjustment of the trade-off between application performance and data synchronicity.

The computer network remote data mirroring system in accordance with the present invention provides insurance for mission critical data. The computer network remote data mirroring system of the present invention achieves high application performance by implementing asynchronous, synchronous, or near synchronous data mirroring using network bandwidth throttling. It provides substantially real-time data mirroring over LANs and WANs to quickly move data offsite, yet does not impact application performance significantly. In the event of a disaster taking the primary data center out of service for hours or days, operations can be transferred to a secondary site within minutes, operating on an up-to-the-minute copy of the original data set.

BRIEF DESCRIPTION OF THE DRAWINGS

The above and other objectives and features and the concomitant advantages of the present invention will be better understood and appreciated by those skilled in the art in view of the description of the preferred embodiments given below in conjunction with the accompanying drawings. In the drawings:

FIG. 10 illustrates an example of network bandwidth throttling in accordance with the present invention;

FIG. 11 illustrates chronological coherency through a comparison of writelog device entry data storage versus the read from data disk technique.

DETAILED DESCRIPTION OF THE PREFERRED EMBODIMENTS

Figure 1:
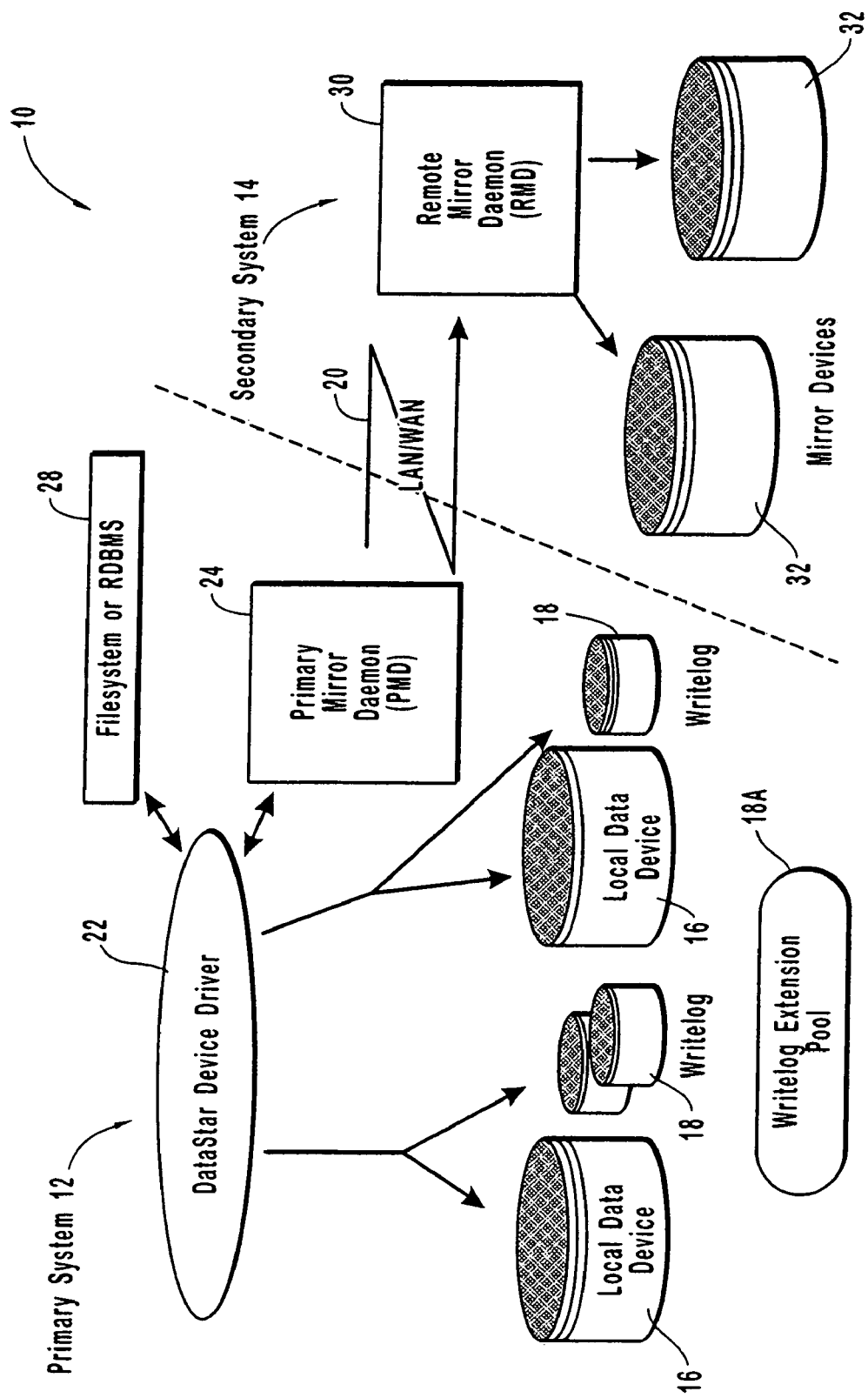
FIG. 1 is a schematic diagram of the architecture of the components of one embodiment of the computer network remote data mirroring system in accordance with the present invention.

The following describes various embodiments of the computer network remote data mirroring system in accordance with the present invention. The computer network remote data mirroring system of the present invention provides a coherent copy of application data on a primary computer system, that is, a copy that can be accessed and used, on a secondary computer system in a disaster recovery scenario. The computer network remote data mirroring system in accordance with the present invention is designed to mirror disk-based data from devices on a primary system to devices on a secondary system, across any available TCP/IP network connection. Data is duplicated in substantially real-time to assure integrity between the two computer systems in the event of hardware failure, natural disaster, or human intervention. The computer network remote data mirroring system of the present invention accomplishes this result through time-sequenced transfers of data from the primary computer system to the secondary computer system over the network. Should a failure occur on the primary computer system, the secondary computer system can provide immediate access to contemporary application data. Both the primary and secondary computer systems are configured to have adequate amounts of disk storage and network bandwidth allocated to accommodate the flow of data needed to provide remote data mirroring.

The computer network remote data mirroring system in accordance with the present invention comprises both computer hardware and software. In order to facilitate an understanding of the computer network remote data mirroring system of the present invention, the computer network remote data mirroring system will be described for an exemplary implementation configured for a computer system platform utilizing a Solaris 2.X series operating system. The technical specifications for such a computer system include the following. The platform can be a Sun SPARC or ULtraSPARC system. The operating system is SPARC Solaris 2.5 or later. The required disk space is 8.5 MB for the software. There are no additional requirements for random access memory (RAM) for the software. Additional storage is required for journal storage (the exact amount depends on specific requirements). An X-windows environment, for example, OpenWindows, CDE, or X11R6, must be installed to use qdsperftool, qdsconfigtcol, or qdsmonitortool, which will be described in more detail later.

The software for the exemplary implementation is currently available as Qualix DataStar Version 1.4 from Qualix Group, Inc., located in San Mateo, Calif., to provide a network-based data mirroring software solution for Solaris 2.X SPARC environments. For example, the software can be provided on CD. The Solaris installation tools pkgadd, pkgrm, and pkginfo are used. The software is installed with the Solaris pkgadd command. The computer network remote data mirroring system in accordance with the present invention requires no modifications to the standard Solaris kernel binaries and is compatible with NFS, VxFS, VxVm, SDS, and other common file systems, volume managers, DBMS, and disk utilities that are not specific to a particular disk type. The exemplary implementation is further described in *Qualix DataStar; Network Mirroring Software, Version 1.4, Operations Guide, Solaris 2.X*, Part No. DS-001-D-SP, November 1997, available from Qualix Group, Inc., San Mateo, Calif., which is hereby incorporated herein in its entirety by this reference.

Generally, the computer network remote data mirroring system of the present invention, generally indicated by the numeral 10 in FIG. 1, comprises various hardware components. The various hardware components are schematically illustrated in FIG. 1 and described in detail below.

The computer network remote data mirroring system 10 comprises a local, or primary, computer system 12. The primary computer system 12 provides primary application and data storage services to a user. During initial installation and normal operation, the primary computer system 12 runs applications and provides access to local data.

The computer network remote data mirroring system 10 also comprises a remote, or secondary, computer system 14. The secondary computer system 14 stores a copy of the data from the primary computer system 12. During initial installation and normal operation, the secondary computer system 14 furnishes a mirror of the local data. There may be more than one secondary computer system 14 in the configuration, each representing a portion of the original data set, as will be described in more detail later.

Considered in more detail, the primary computer system 12 comprises a local data device 16 which is specified as a character special device (a disk partition or a managed volume) (but pertains to both the special character device and the block mode device) that provides storage for data on the primary computer system. Typically, the local data device 16 comprises a disk drive device. Reads of disk data are always satisfied by direct access to the local data device 16. This data is duplicated onto the secondary computer system 14.

The primary computer system 12 also comprises a writelog device 18 which is specified as one or more special character devices (but pertains to both the special character device and the block mode device) on the primary computer system used for the journaling of time-sequenced writes to the local data device 16. As shown in FIG. 1, a writelog device 18 is preferably allocated for each local data device 16 so that a one-to-one relationship typically exists between the local data devices and the writelog devices. The writelog device 18 maintains the chronological integrity of data entries being sent across a network 20 to the secondary computer system 14, as will be described in more detail later.

In one embodiment, the writelog device 18 comprises a redundant data storage device, such as a disk drive device. In this embodiment, the writelog device 18 is a disk-based journal for I/O data updates and is associated with the local data device 16 managed by a device driver 22. In another embodiment, the writelog device 18 comprises cache memory and a dirty bit map disk drive device managed by the device driver 22, to which data can be written from the cache memory to avoid a memory overflow condition. In the embodiment in which cache memory is utilized, the RAM requirements of the primary computer system 12 increase. In one exemplary implementation, the RAM required may increase to 128 MB or more.

Peak data update rate is preferably used to determine writelog device sizing. In one exemplary implementation, the minimum size of the writelog device 18 is 150 kilobytes (KB). However, the size of the writelog device 18 is preferably at least two MB.

Figure 2:
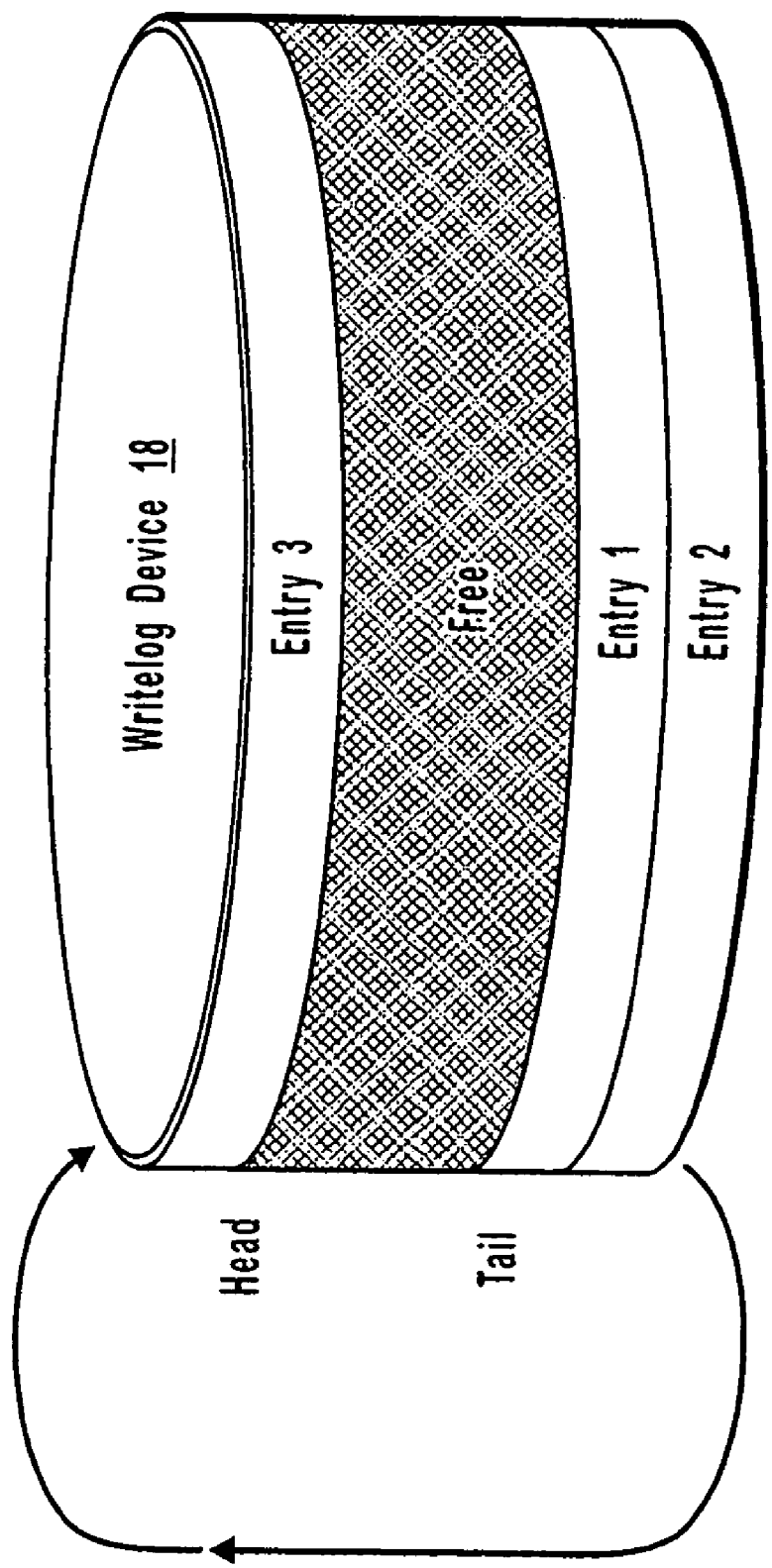
FIG. 2 shows one embodiment of a writelog device configuration for incorporation into the system shown in FIG. 1.

Referring to FIG. 2, the writelog device 18 is preferably organized as a time-sequenced circular queue. The oldest I/O data updates, or data entries, reside at the tail of the writelog device 18, and new data entries are placed at the head of the writelog device. When the head of the writelog device 18 grows to the end of the writelog device, it wraps back to the beginning of the device.

If the head of the writelog device 18 were to grow sufficiently beyond the tail that it would "lap," or overwrite it, a writelog device overflow condition would result, a state that would invalidate the writelog device and "break the mirror." The computer network remote data mirroring system 10 prevents writelog device overflow, as will be described shortly.

Each entry written to the writelog device 18 consists of data and a header. The header contains important information used by other system components, such as a timestamp, sequence number, device offset, and size of the transaction. The oldest data entries are read from the end or tail of the writelog device 18 and sent across the network 20, while new data entries are written to the beginning or head of the writelog device. A reserved area at the beginning of the writelog device 18, that contains metadata about the writelog device, is updated every m time an entry is written to or read from the writelog device or if a configurable period of time has elapsed since the last update of the metadata. The writelog device 18 is a circular queue that allows new data entries to overwrite older data entries only after the device driver 22 has received confirmation that the older data entry has been committed to a mirror device 32 on the secondary computer system 14.

During operation, a writelog device 18 may be in danger of overflow if a primary mirror daemon 24 which comprises the primary computer system 12 is unable to allocate space for incoming data entries. If the head of the writelog device 18 becomes big enough that it would overwrite the tail, an overflow condition is said to have occurred. An overflow would "break the mirror" at the point in time of the overflow. Instead, the computer network remote data mirroring system 10 avoids the overflow condition so that an overflow does not invalidate the entries in the writelog device 18 or cause data corruption of any kind.

Specifically, in accordance with the present invention, the writelog device 18 is configured so that more memory or disk space is dynamically assigned to the writelog device to prevent a memory overflow condition which might otherwise corrupt stored data. In the embodiment in which the writelog device 18 comprises a disk drive device, additional disk storage is dynamically assigned or another disk storage device is chained into the primary computer system 12. In the embodiment in which the writelog device 18 comprises cache memory and a dirty bit map disk drive device, additional disk storage is dynamically assigned or another disk storage device can be chained into the primary computer system 12 to prevent memory overflow.

Considered in more detail, the primary computer system 12 preferably comprises a writelog device extension pool 18A which is a collection of writelog devices that are not in use and act as spares. These writelog devices can be automatically chained into existing writelog devices which comprise the writelog device 18 by user-defined throttles if an overflow is imminent (i.e., an overflow condition occurs). In one exemplary implementation, a maximum of 128 writelog devices can be placed in the writelog device extension pool 18A which comprises the writelog device 18.

Figure 3:
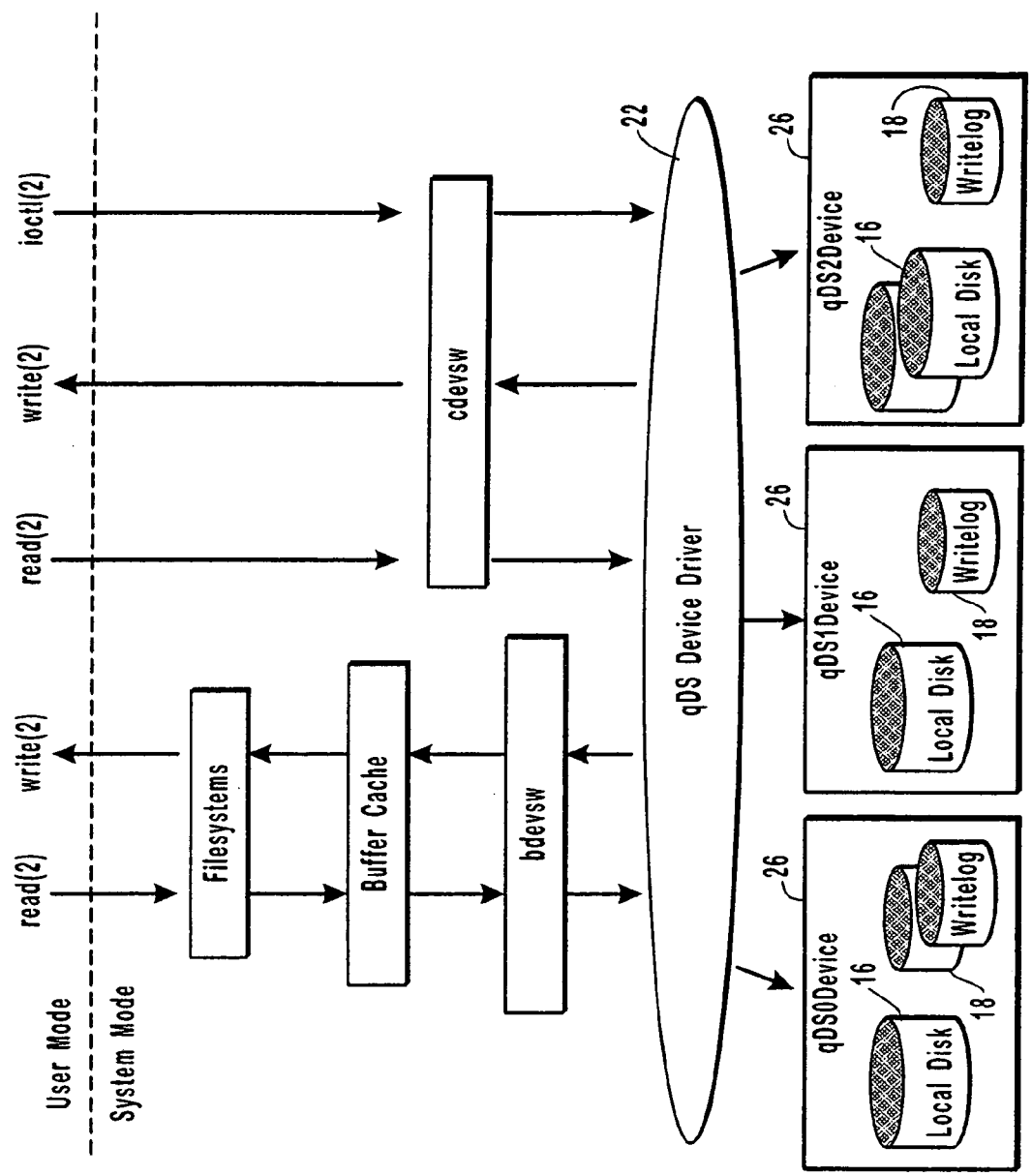
FIG. 3 shows the position of a device driver in the kernel of the system shown in FIG. 1 and its relationship to a local data storage unit in the system shown in FIG. 1.

Preferably, as shown in FIG. 3, each local data device 16 and associated writelog device 18 are configured as a local data storage unit 26. Each local data storage unit 26 is the means by which applications or file systems interact, access, or store data while executing the software that comprises the computer network remote data mirroring system 10. This provides the mapping to and management of a specific local data device 16, the affiliated writelog device 18, and the associated mirror device 32. The local data storage unit 26 is only defined on the primary computer system 12. Preferably, there is a local data storage unit 26 instance for each local data device/writelog device pair 16, 18 on the primary computer system 12. Each local data storage unit 26 instance is assigned a unique name, for example, qds0, qds1, qds2. Local data storage unit 26 names typically begin with zero and increment by one. Both block mode and special character device entry points are provided for each defined local data storage unit 26.

As shown in FIG. 3, each local data storage unit 26 appears as a raw disk partition to the kernel. Therefore, each local data storage unit 26 accepts and handles any request that can be made to a normal raw disk partition or fixed size volume, such as create and mount a file system, or support DBMS table space allocations.

Local data storage units 26 are not shared by the primary computer system 12 and the secondary computer system 14. Rather, data is mirrored across the network 20 from the writelog 18 to mirror devices 32. If the user data center wants the secondary computer system 14 to assume all activities if the primary computer system 12 fails, then application software must reside on both computer systems 12, 14. Applications on the secondary computer system 14 are not executed until the secondary computer system is required to act as the application server. The mirror devices 32 on the secondary computer system 14 are not accessed while the computer network remote data mirroring system 10 is in normal operation.

Referring to FIGS. 1 and 3, the computer network remote data mirroring system 10 comprises the device driver 22 installed just above the actual disk device drivers or volume management device drivers, but architecturally below file systems or applications 28. As a result, any disk-based file system supported by Solaris 2.X is compatible with the computer network remote data mirroring system 10, as are applications 28 that work directly with raw disk devices (databases). Advantageously, the device driver 22 for the local data device 16 and the write log device 18 is layered on top of the operating system environment, so that the computer network remote data mirroring system 10 ports to many commercially available computer systems.

The writelog device 18 is accessed only by the device driver 22. All software-based utilities and daemons access the writelog device 18 through private I/O control (IOCTL) calls to the device driver 22.

The device driver 22 supports block and special character devices which provide services to the kernel and user. Typically, block device drivers are limited to transferring blocks of a fixed size and use a buffer cache as an interface between the driver and the user application or file system. The special character device allows the device driver 22 to be addressed in units smaller or larger than the device block size. These transfers are performed independently of the file system or buffer cache and allow the kernel to transfer data directly to or from the underlying local data storage unit 26. The device driver 22 requires no modifications to the kernel binaries. FIG. 3 shows the position of the device driver 22 in a conventional UNIX kernel and its relationship to the local data storage unit 26.

As shown in FIG. 3, the device driver 22 performs a data update both to the local data device 16 and to the local, chronologically sequenced journal storage area, or writelog device 18. Once written to the local data device 16 and the writelog device 18, I/O operation returns control to the application. This delivers to the application I/O performance comparable to simple local disk mirroring.

Considered in more detail, when the device driver 22 receives a call that will modify data on the local data device 16 (write or strategy), it places copies of the data on both the local data device 16 and at the head of the writelog device 18. Special processing ensures transactional integrity should the primary computer system 12 go down while these writes take place, as will be described shortly. Preferably, the primary computer system 12 comprises at least two disk controller cards with the local data device 16 configured on one arid the writelog device 18 configured on the other. This enables the local data device 16 and the writelog device 18 to be on separate I/O busses. Consequently, performance is dramatically improved due to reduced I/O bus contention during the parallel writes. In one embodiment, the local data device 16 and the writelog device 18 are located on separate disks and are preferably under separate SCSI controllers for optimal application performance.

The device driver 22 creates the metadata header for the I/O data update that is added to the head of the writelog device 18, followed by the data from the update. As described earlier, this header contains the offset and the length of the update data, a timestamp, a global sequence number (unique between all writelog device entries), and a local sequence number (unique within the current writelog device). These sequence numbers are used to ensure that the order of the data entries in the writelog device 18 exactly follows the sequence in which they are generated by the application.

In accordance with the present invention, a method is provided for ensuring data integrity through a systems failure while data updates are occurring in parallel to two data storage devices, such as disk drive devices, simultaneously. The disks comprise the local data device 16 and, in the embodiment in which the writelog device 18 comprises a disk drive device, the writelog device disk. The local data device 16 and the writelog device 18 are simultaneously updated through the device driver 22. Preferably, each disk is provided with a disk interface, such as a SCSI interface, to enhance reliability and speed of data updates. Consequently, data is written and thus stored substantially simultaneously on both the local data device 16 and the writelog device 18. Therefore, the computer network remote data mirroring system 10 uses the device driver 22 to perform disk updates simultaneously both to the local data device 16 and to the local, chronologically sequenced journal area, or writelog device 18. Once the data has been written to these two devices, the I/O operation returns control to the application.

The method in accordance with the present invention accommodates any of three conditions that may arise in the event of a system crash. The first condition is that the same update data has been stored on both the local data device 16 and in the writelog device 18; the second condition is that the update data was stored on the local data device, but failed to be stored in the writelog device; and the third condition is that the update data was written to the writelog device, but failed to be stored on the local data device. In accordance with the method of the present invention, the current update data is written to the writelog device 18, while the immediately preceding update is written to the local data device 16. If the primary computer system 12 crashes, upon recovery or reboot of the primary computer system, the two most current data updates in the writelog device 18 are written to the local data device 16 to assure that the data stored on the local data device is current.

As mentioned earlier, the primary computer system 12 comprises the primary mirror daemon 24 on the primary computer system. The primary mirror daemon 24 monitors the writelog device 18 for updates and feeds the data over the network 20 in the same order in which it is stored to a receiving remote mirror daemon 30 on the secondary computer system 14, which in turn commits the updates to the mirror device 32. The data updates remain in the journal area of the writelog device 18 on the primary computer system 12 until the remote mirror daemon 30 sends an acknowledgement receipt back to the primary mirror daemon 24 confirming that the data updates have been committed to the mirror device 32. This may be thought of as a form of "two-phase commit."

The primary mirror daemon 24 is a user-mode background program running on the primary computer system 12, that communicates with each secondary computer system 14 in the computer network remote data mirroring system 10. Once a connection is established and authenticated, the primary mirror daemon requests journaled transactions from the writelog device 18 through the device driver 22. Data is transferred in chronological order (oldest first) from the writelog device 18. The primary mirror daemon 24 sends these journaled transactions across the network 20 to the secondary computer system 14.

The computer network remote data mirroring system 10 comprises the network 20. Typically, the network 20 is a networking environment that supports the TCP/IP protocol stack. The computer network remote data mirroring system 10 also supports transport technologies including, but not limited to, Ethernet, fast Ethernet, token ring, ATM, and FDDJ.

The secondary computer system 14 comprises at least one mirror device 32 which is specified as a special character device (but pertains to both the special character and block mode devices) on the secondary computer system onto which data is mirrored. A mirror device 32 is required on the secondary computer system 14 for each local data device 16 on the primary computer system 12. The mirror device 32 must be the same size as or larger than the corresponding local data device 16. During normal operation of the computer network remote data mirroring system 10, the mirror devices 32 contain a coherent, that is, usable, copy of the data stored on the primary computer system 12.

The secondary computer system 14 also comprises the remote mirror daemon 30. The remote mirror daemon 30 writes the data updates received from the primary mirror daemon 24 to the mirror device 32 on the secondary computer system. The data updates remain in the writelog device 18 at the primary computer system 12 until the remote mirror dae-mon 30 sends an acknowledgement receipt back to the primary computer system 12 confirming that the data updates were committed to the mirror device 32.

The remote mirror daemon 30 is a user-mode background program running on the secondary computer system 14. The remote mirror daemon 30 receives data blocks sent by the primary mirror daemon 24 and writes the data blocks to the associated mirror device 32.

In the exemplary implementation, there are three ways to start the primary mirror daemon 24 and the remote mirror daemon 30. A first is to launch the daemons 24, 30 on system re-boot automatically by execution of standard boot scripts. A second is to execute /opt/QLIXds/bin/launchpmds and /opt/QLIXds/bin/launchrmds shell scripts from the command line, or the remote mirror daemon 30 can be automatically started by the inetd daemon when the primary mirror daemon 24 is launched. A third is to execute /opt/QLIXds/bin/in.pmd and /opt/QLIds/bin/in.rmd programs from the command line.

Figure 4:
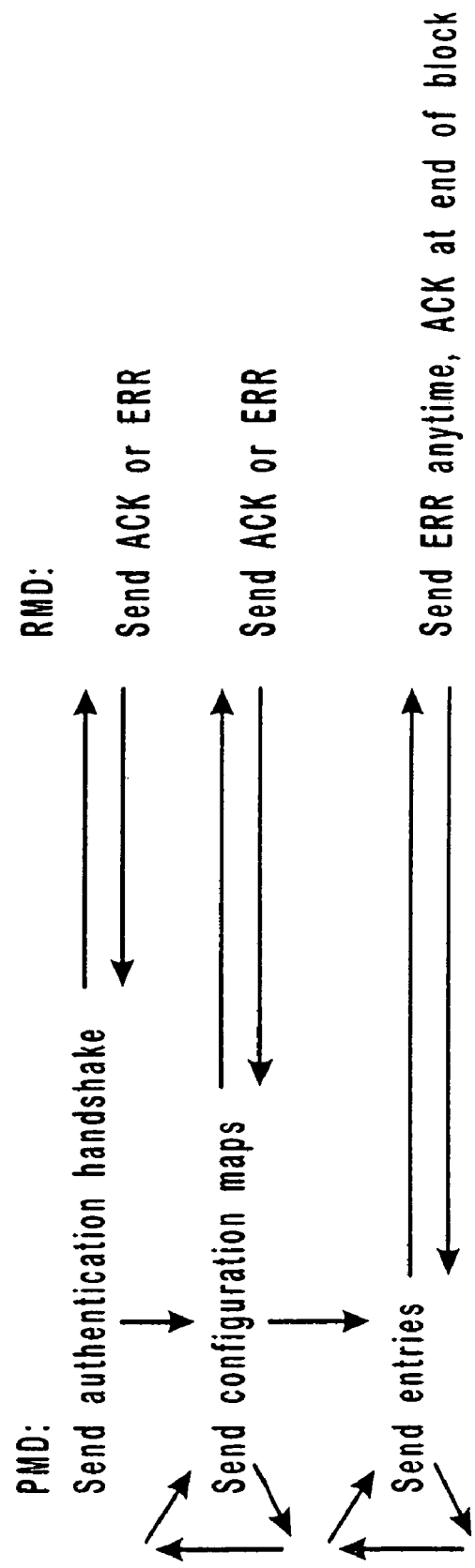
FIG. 4 illustrates primary mirror daemon/remote mirror daemon protocol.

The protocol between the primary mirror daemon 24 and the remote mirror daemon 30 is illustrated in FIG. 4. Once communication is established between the primary mirror daemon 24 and the remote mirror daemon 30, the primary mirror daemon sends an authentication handshake. The information contained within this initial exchange authenticates the connection and instructs the remote mirror daemon 30 to open its copy of the configuration file, verify the information therein, and create internal structures on the secondary computer system 14. The remote mirror daemon 30 then opens the mirror device 32. To assure the data integrity of these volumes, the mirror device 32 is opened exclusively for the remote mirror daemon 30 and cannot be accessed by any other program when the remote mirror daemon is running. The remote mirror daemon 30 receives data updates from the primary mirror daemon 24, commits these data updates to the mirror device 32, and sends a confirmation that the data update took place on the mirror device back to the primary mirror daemon.

In accordance with the present invention, failure recovery with the primary and remote mirror daemons 24, 30 is initiated automatically for certain failures which do not affect the basic operability of the overall computer system. For example, the computer network remote data mirroring system 10 is automatically recovered upon power shutoff of one of the primary computer system 12 or the secondary computer system 14 or temporary loss of the network link normally established by the network 20. A startup script is provided to automatically start the computer network remote data mirroring system 10 when the primary computer system 12 restarts.

Figure 5:
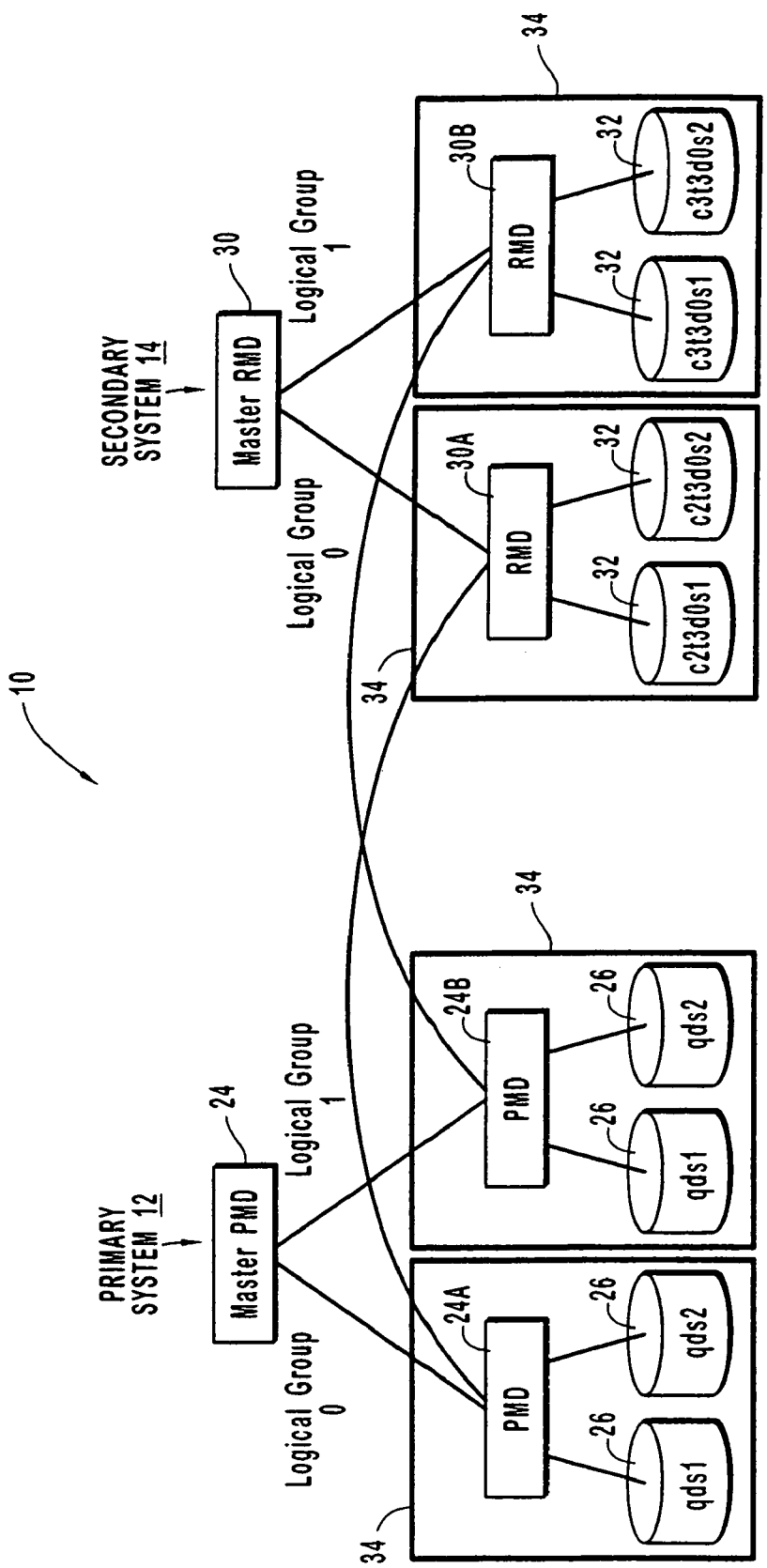
FIG. 5 is a schematic diagram of the architecture of logical groups.

Also in accordance with the present invention, the computer network remote data mirroring system 10 can be structured to provide volume grouping, or logical groups 34, as shown in FIG. 5. That is, a collection of local data storage units 26 can be configured as a coherent unit, called a logical group 34. In one exemplary implementation, the computer network remote data mirroring system 10 supports up to 512 logical groups 34, each with an unlimited number of local data storage units 26. Placing affiliated local data storage units 26 in the same logical group 34 is an effective way to configure an efficient system. Consequently, data at the primary computer system 12 can be replicated at a plurality of remote computer systems 14, as compared to known architectures which provide point-to-point (local to a single remote site) data mirroring. Accordingly, the computer network remote data mirroring system 10 provides a master primary mirror daemon 24 and associated child primary mirror daemons 24A and 24B, as well as a master remote mirror daemon 30 and associated remote mirror daemons 30A and 30B, to process data for replication. A graphical user interface is preferably provided by the computer network remote data mirroring system 10 for configuring the logical groups 34, as well as for monitoring performance of the remote data mirroring system.

Considered in more detail, FIG. 5 illustrates the relationship between local data storage units 26, logical groups 34, primary mirror daemons 24, 24A, 24B, and remote mirror daemons 30, 30A, 30B. It is possible to have a plurality of local data devices 16 configured within a logical group 34 to share a writelog device 18 (through internal partitioning), but this practice is heavily discouraged due to the excessive performance penalty it imposes. Each logical group 34 operates with its own independent primary mirror daemon/remote mirror daemon pair, for example, primary mirror daemon 24A and remote mirror daemon 30A.

There are various reasons to have several logical groups 34 defined. For example, some applications 28, especially databases, may work with a number of disk devices at the same time. It is preferable that chronological coherency be maintained, not only within a local data storage unit 26, but also between local data storage units so that one device is no more up to date than any other. In such a situation, chronological coherency of I/O transfers can be maintained by organizing the local data storage units 26 into a logical group 34. The logical groups 34 are a means of organizing local data storage units 26 to ensure chronological coherency is enforced between the member devices. Should the primary computer system 12 go out of service at any point during network transfers, the mirror devices 32 on the secondary computer system 14 for a logical group 34 will be current to a specific point in time, allowing the application to transfer cleanly to the secondary computer system. Also, individual logical groups 34 can be targeted independently to secondary computer systems 14, thus creating a one-to-many configuration. Additionally, logical groups 34 can utilize independent network connections to the secondary computer system 14, thus creating an aggregated throughput greater than that of any single network connection. Furthermore, the failure of one logical group 34 does not affect the operations of any other logical groups. The aggregate data rate is used in determining network bandwidth required to sustain the flow of data from the logical group 34, The logical groups 34 represent the highest level of organization for the computer network remote data mirroring system 10. Configuration files (e.g., /etc/opt/QLLXds/dsgrp000.cfq) are defined for each logical group 34 specifying: primary and secondary computer systems 12, 14, writelog device extension pools 18A, tunable primary mirror daemon parameters, throttles, and configurations of the member local data storage units 26. FIG. 5 illustrates the relationships between the logical groups 34 on the primary computer system 12 and the secondary computer system 14, the member local data storage units 26, and the primary and remote mirroring daemons 24, 30. As each logical group 34 has its own set of daemon processes, the failure of a single logical group will not impact the combined operation of the other logical groups. An additional feature of the computer network remote data mirroring system 10 is that each logical group 34 may be independently targeted to a secondary computer system 14. This means that multiple network channels between the primary and secondary computer systems 12, 14 may be exploited by the independent logical groups 34, or that the primary computer system 12 may target multiple secondary computer systems 14 for remote data mirroring.

As described earlier, a writelog device extension is specified as a special character disk device that is reserved for use if overflow of the current writelog device 18 is imminent. The primary mirror daemon 24 acquires and releases writelog device extensions from the writelog device extension pool 18A when any local data storage unit 26 within the logical group 34 reaches the threshold for overflow or under utilization as set by throttles in the configuration file. Preferably, writelog device extensions are not utilized by default; that is, writelog device extensions are not a required part of the logical group definitions. They are a safeguard available against writelog device overflow. Throttles must be defined in the configuration file and these devices must be included in the writelog device extension pool 18A. Devices defined as writelog device extensions are stored in the writelog device extension pool 18A for each logical group 34. Extensions in the pool are available to any local data storage unit 26 in the logical group 34. In one exemplary implementation, an individual local data storage unit 26 can have a total of sixteen writelogs (one main and fifteen extension) assigned to it at any point in time.

In the embodiment in which the computer network remote data mirroring system 10 comprises logical groups 34, the primary mirror daemon 24 looks in the /etc/opt/QLIXds directory and creates a child primary mirror daemon process for each configuration file that it finds. A configuration file exists for each logical group 34. Therefore, each logical group 34 has its own primary mirror daemon process. In the embodiment which comprises logical groups 34, the term primary mirror daemon includes the child processes. The term master primary mirror daemon is used to identify the main dispatching daemon, that is, the primary mirror daemon 24. The master primary mirror daemon 24 monitors all of the child primary mirror daemon processes and relaunches them should they fail unexpectedly, for example, because of a temporary network failure.

Each primary mirror daemon 24A, 24B reads its assigned configuration file. The primary mirror daemon 24A, 24B opens a remote connection to the port number of the remote mirror daemon 30A, 30B on the secondary computer system 14 given in the configuration file (defaultport: 575). Since each logical group 34 has a primary mirror daemon process, each logical group may have a connection to a distinct and separate secondary computer system 14.

As with the master primary mirror daemon 24, in the embodiment in which the computer network remote data mirroring system 10 comprises logical groups 34, there is a master remote mirror daemon 30 that monitors the network 20 for new connections and creates a child remote mirror daemon process for each. In the embodiment which comprises logical groups 34, the term remote mirror daemon includes the child processes. The term master remote mirror daemon is used to identify the main dispatching daemon, that is, the remote mirror daemon 30.

The set of daemon processes, that is, the primary mirror daemon 24A, 24B on the primary computer system 12 and the remote mirror daemon 30A, 30B on the secondary computer system 14, are used to move accumulated data updates from the writelog devices 18 of a logical group 34 across the network 20 onto the associated mirror device 32 of the secondary computer system 14. These daemons 24A, 24B, 30A, 30B create a TCP/IP connection over a well-known socket port (defaultport: 575) to effect this transfer of data updates. The protocol employed is very efficient and minimal Advantageously, whether configured with or without logical groups 34, the computer network remote data mirroring system 10 operates over different network configurations and is compatible with many different local and remote disk storage devices which comprise the local data device 16, writelog device 18, and mirror device 32. The computer network remote data mirroring system 10 operates with all disk subsystems supported by Solaris 2.X. For the Solaris 2.X environment, each disk is partitioned and accessed in the manner described in the *Solaris Systems Administration AnswerBook*. The computer network remote data mirroring system 10 allows the user to begin mirroring existing database or file system data by simply incorporating the devices or volumes on which this data is stored into the computer network remote data mirroring system 10. Disks do not need to be repartitioned or reformatted, file systems do not need to be re-initialized, and data does not need to be exported/imported.

In the exemplary implementation, after the installation and configuration of the computer network remote data mirroring system 10, file system mount tables or applications taking advantage of raw disk devices need only to reference the local data storage unit 26 created (e.g., /dev/dsklqdsl3) rather than the disk partition (e.g., /dev/dsk/e3t2d0s4) or managed volume (e.g., /dev/vx/dsk/vol3) to have all I/O updates automatically mirror to the secondary computer system 14. This installation can take place without modification of the original data set. No backup/restore or conversion activity is required of the data set.

In accordance with the present invention, various throttles are provided. Throttles are a facility that enables the user to automate the administration of the computer network remote data mirroring system 10. Throttles are a very general mechanism that keeps a computer system operating within a range defined by the throttle by automatically modifying the configuration and alerting the user to system trends or problems. The primary mirror daemon 24 evaluates the throttles periodically and performs the actions specified by them.

Considered in more detail, throttles are user-defined tests and actions evaluated by the primary mirror daemon 24 periodically. Throttles have a multifold purpose: to limit system and network resource consumption by the computer network remote data mirroring system 10; to deal with pending writelog device overflow or underflow conditions dynamically; to notify system and network administrators of problems; and to execute external programs or scripts.

Throttles are defined in the logical group configuration file. An unlimited number of throttles may be defined for a logical group 34, and each throttle may have up to sixteen actions that are executed if the throttle evaluates as true. Throttles may be defined to evaluate only between certain times of day, making it possible to configure the computer network remote data mirroring system 10 around business needs, such as not utilizing the entire network bandwidth during normal business hours.

Throttles are not a general purpose macro language, but a very efficient set of programmed activities that will not impact the performance of the primary mirror daemon network transfers when executed. In the case in which the computer network remote data mirroring system 10 is configured with one or more logical groups 34, throttles support sophisticated testing against the following run-time determined measurements: the KB of data sent across the network 20 per second for the logical group 34; the percent of the writelog device 18 in use for any local data storage unit 26; and the percent of central processing unit (CPU) resources that the child primary mirror daemon 24A, 24B is consuming. Actions that a throttle may invoke include: set, increment, or decrement a sleep value (in microseconds) performed prior to each data entry transmission; set, increment, or decrement a sleep value (in microseconds) that the local data storage unit 26 will wait prior to returning control to applications after an update; chain in an extension disk device to a writelog device 18 to increase the size of the writelog device (up to fifteen extensions permitted in one exemplary implementation); free a writelog device extension disk device to go back to the writelog device extension pool 18A until needed again; log a message to sys log; write a message to the system console; send an e-mail message to the user; and execute an arbitrary shell command (built-in, script, or external program). For example, if a network failure is detected, the on-call operator could be paged. Once the failure is cleared, a message to the system console could update the status display.

Figure 6:
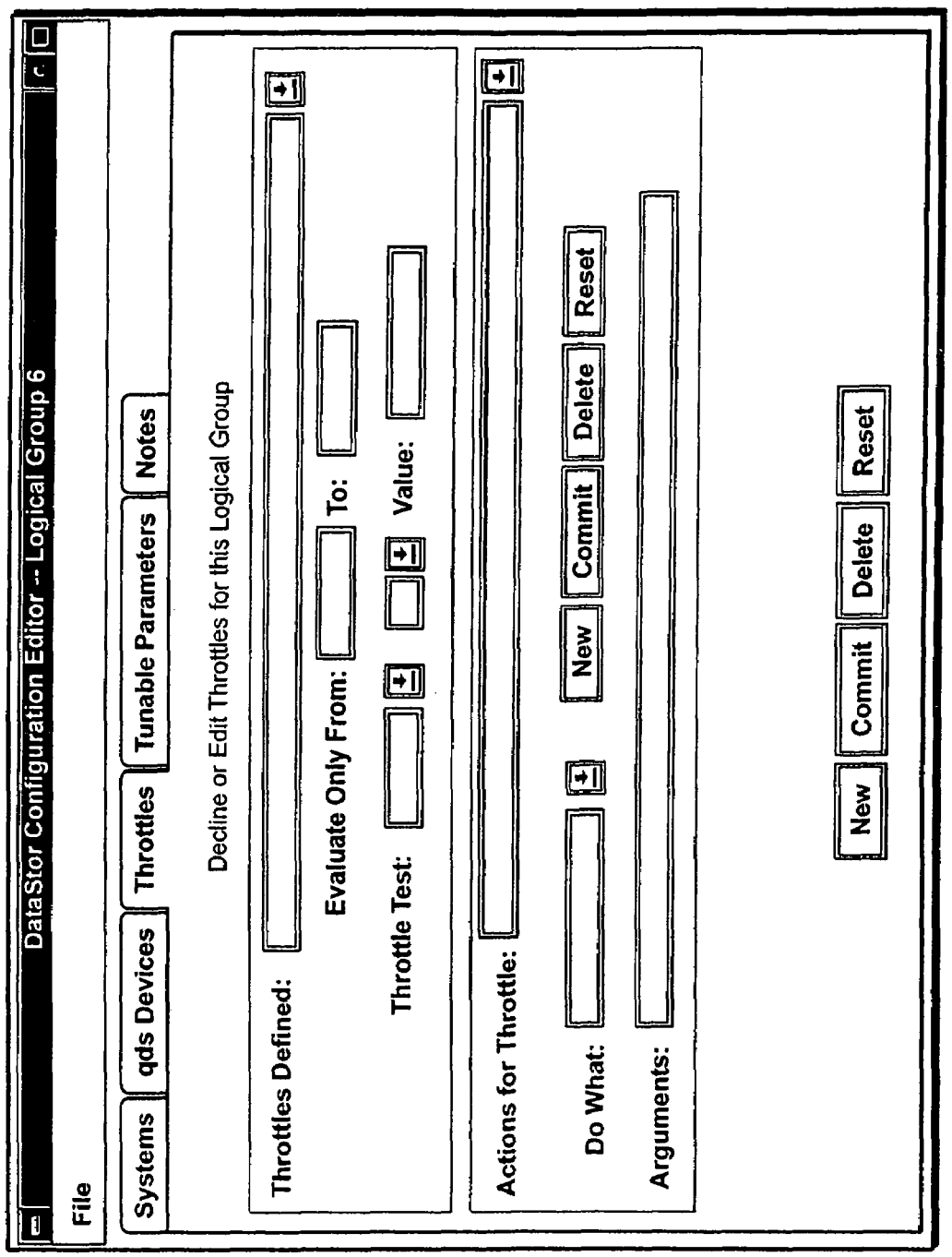
FIGS. 6-9 illustrate various screens of a graphical user interface used to configure throttles in accordance with the present invention.

Throttles are preferably configured using a graphical user interface provided by the qdsconfigtool utility. As shown in FIG. 6, a "Throttles" tab brings up a screen that enables the user to define throttles for the current logical group 34. The throttles screen is divided into two sections. One section is a "Throttles Defined" section which appears in the upper portion of the screen. It provides the elements required to create a throttle. It also lists any previously defined throttles for the given logical group 34.

The second section is an "Actions for Throttle" section which appears in the lower portion of the screen. This section, the ACTIONLIST, identifies selectable actions to be carried out when the throttle evaluates to true. In one exemplary implementation, each throttle may have up to sixteen actions in the ACTIONLIST. The user can view the ACTIONLIST by clicking the down arrow to the right of the "Actions for Throttle" field.

The buttons at the bottom of the screen, namely, "New," "Commit," "Delete," and "Reset," apply to the entire throttle, while those located at the center of the screen apply only to the ACTION currently being defined or edited. The user clicks on the arrow to the right of the "Throttles Defined" field to display a list of all existing throttles defined for the given logical group 34.

Figure 7:
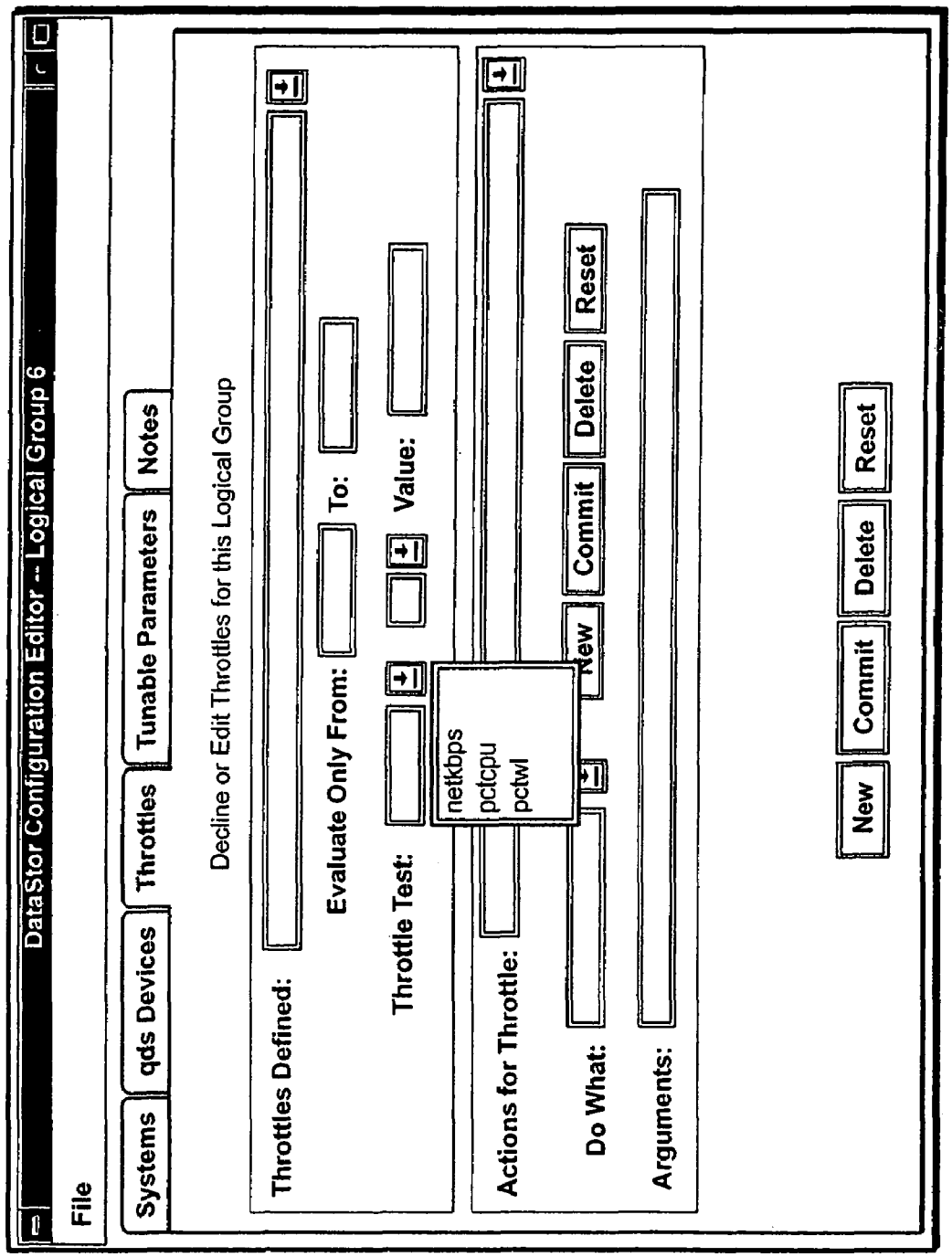
Figure 8:
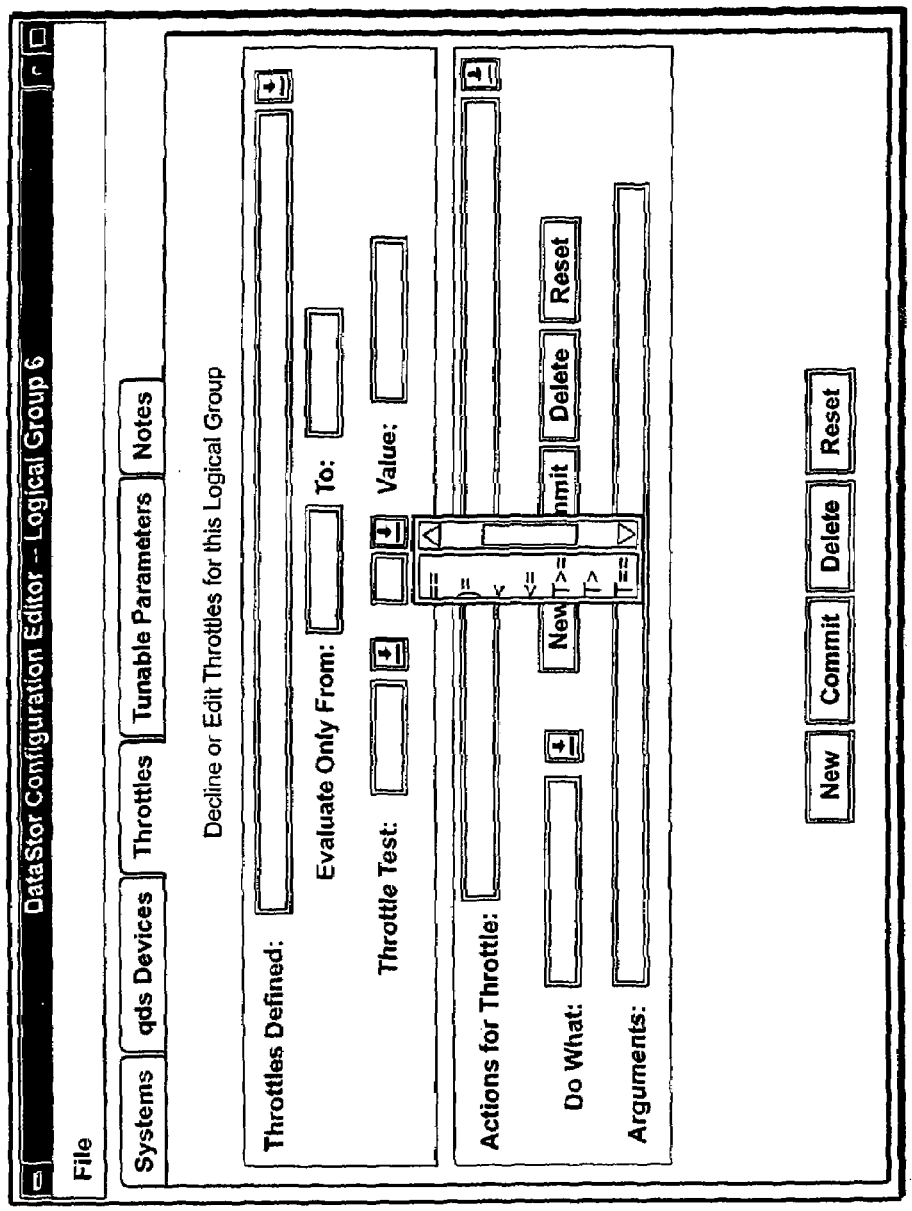

In order to create a throttle, the following steps are performed. First, the user clicks on the "New" button which appears at the bottom of the screen. Second, the user enters a "From" and a "To" time in HH:MM:SS format, if applicable. This identifies the time span during which the throttle is active. If the throttle is not time dependent, the user simply enters "--" in both the "From" and "To" fields. Third, the user selects a "Throttle Test." This is accomplished by initially clicking on the down arrow next to the "Throttle Test" field and then choosing one of three options ("netkbps," "pctcpu," or "pctwl") to determine which system component is regulated by the throttle, as shown in FIG. 7. The three options determine which system component, namely, network bandwidth, CPU, or writelog device utilization, is being controlled. These options are as follows: "netkbps" is the KB per second being transferred over the network 20 from the primary mirror daemon 24 to the remote mirror daemon 30; "pctcpu" is the percentage of CPU time consumed by the primary mirror daemon; and "pctw1" is the percentage of the writelog device 18 in use for any writelog device in the logical group 34. Fourth, the user chooses a relational or transitional logical operator from the pulldown menu in the center of the screen, as shown in FIG. 8. Fifth, the user enters an integer value into the "Value" field for comparison to the actual system component usage. This completes the creation of the throttle for the given logical group 34.

Figure 9:
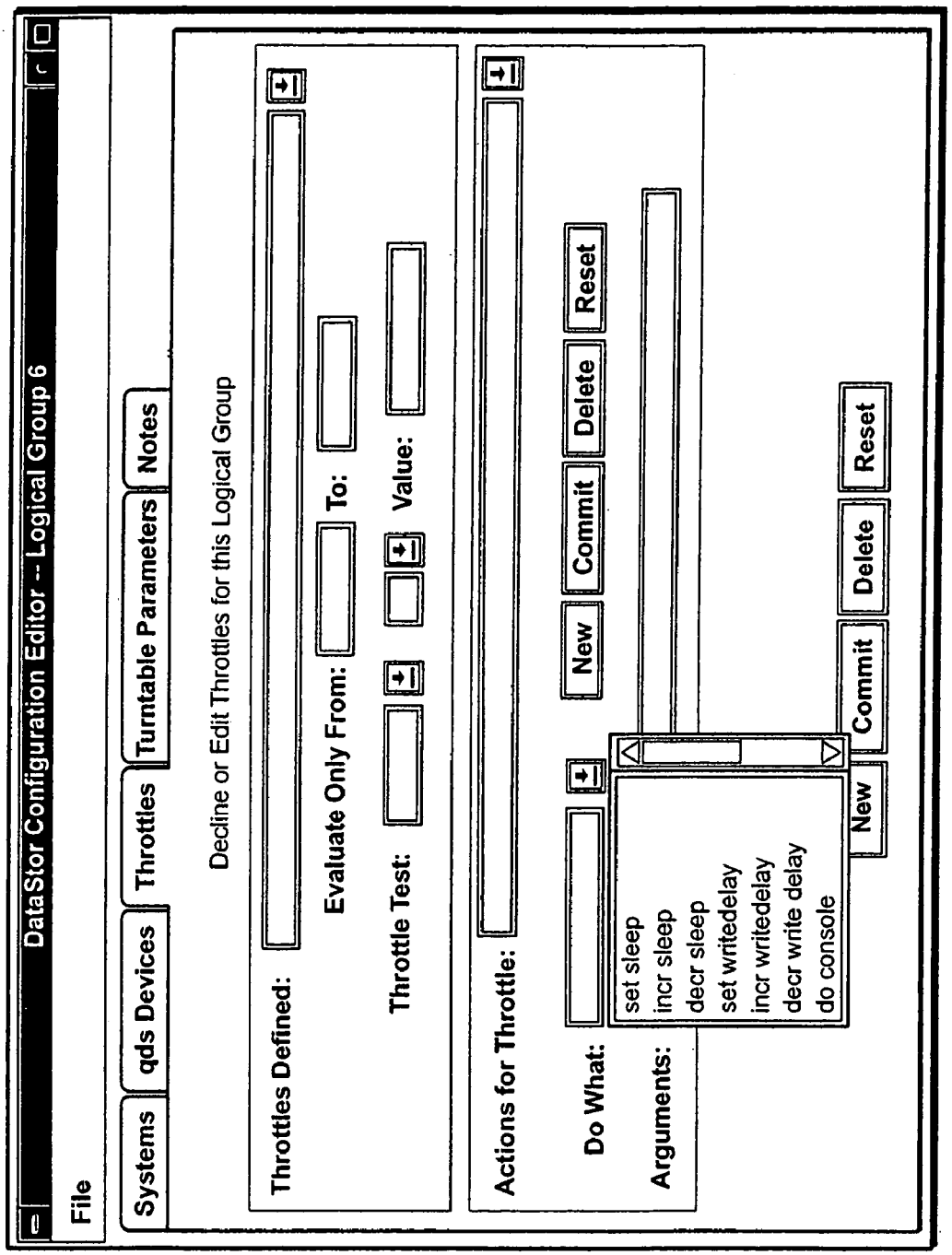

In order to create the ACTIONLIST for the new throttle, the user performs the following additional steps. First, the user clicks on the "New" button in the "Actions for Throttle" section of the screen. Second, the user selects an ACTION from the "Do What" pulldown menu, as shown in FIG. 9. For example, "sleep" causes the primary mirror daemon 24 for the given logical group 34 to sleep a preselected number of microseconds after each transmission of data to the remote mirror daemon 30 when the criteria outlined in the throttle definition are met. Accordingly, the user selects "sleep" to limit consumption of network and CPU resources. Third, the user enters any applicable arguments into the "Arguments" field to preselect the extent of the selected action. Fourth, the user clicks on the "Commit" button which appears at the center of the screen to elect the ACTION. If the user wants to assign more ACTIONs to the current throttle, the user repeats the first four steps used to create the ACTIONLIST. In one exemplary implementation, throttles are evaluated every ten seconds by default.

In accordance with the present invention, the computer network remote data mirroring system 10 provides network bandwidth throttling. Bandwidth throttling enables a predetermined portion of the bandwidth of the network 20 to be assigned to remote data mirroring depending on the time of day or other criteria. Accordingly, the user can restrict network consumption during prime hours of operation and automatically increase bandwidth use at specified times.

Considered in more detail, the computer network remote data mirroring system 10 enables the user to manage performance. That is, the computer network remote data mirroring system 10 allows the user to define the amount of network bandwidth available for the data replication process. By doing so, the user can maximize business-critical services during peak times and maximize replication when more bandwidth is available.

To optimize performance, several methods can be used to minimize processing and I/O overhead and produce efficient network throughput. The computer network remote data mirroring system 10 includes dynamic controls that allow the user to fine tune the rate at which the primary mirror daemon 24 transfers data, based on the time of day and/or the dynamic state of the application. Throttles allow the user to limit the network bandwidth and CPU utilization required by the computer network remote data mirroring system 10. Furthermore, the user can automatically change the controls based on the time of day.

For example, if the user network connection is congested, the user may choose to slow down data transfer by the computer network remote data mirroring system 10 during peak hours (e.g., 8:00 AM to 5:00 PM) and then remove the restriction after hours. The dynamic controls of the computer network remote data mirroring system 10 enable the user to define how much and when computer system/network resources are used for remote data mirroring.

An example of network bandwidth throttling is illustrated in FIG. 10. In the example, the following throttles regulate network bandwidth consumption. The first two throttles deal with maintaining usage of the network 20 below a certain point. Note that "sleep" is incremented by 15,000 microseconds if usage exceeds 200 KB per second. If network usage continues to increase and exceeds 300 KB per second, "sleep" is incremented by 5,000 microseconds every time the throttle evaluates true. The remaining throttles focus on maintaining network usage. If usage begins to decline, "sleep" is decremented continuously until it reaches zero.

In operation, the preferred configuration of the computer network remote data mirroring system 10 is for the accumulation of data updates in the writelog device 18 to occur independently of the transmittal of these data entries to the secondary computer system 14. This dissociation is termed asynchronous accumulation, or for short, asynchronous mode. The advantage of such a configuration is that applications realize near normal I/O performance, while the daemon processes can exploit network bandwidth optimally. The asynchronous mode is the default operating mode for the embodiment in which the computer network remote data mirroring system 10 comprises the logical groups 34. In the asynchronous mode, the journaling of data updates to the writelog device 18 has no bearing on when the primary mirror daemon process will transmit the data updates to the secondary computer system 14.

Alternatively, the computer network remote data mirroring system 10 can be configured in the synchronous mode. The synchronous mode does not return control to an application until after a data update has been committed to both the local data device 16 on the primary computer system 12 and the mirror device 32 on the secondary computer system 14. In the synchronous mode, the mirror device 32 is an exact copy of the local data device 16 at all times. However, UFS file systems on top of a device defined in synchronous mode will continue to perform update I/Os asynchronously. The synchronous mode is an operating mode that requires that the primary mirror daemon 24 transmit an update to the secondary computer system 14 and receive confirmation that it was committed to the mirror device 32 before allowing the device driver 22 to return control to the application being executed on the primary computer system 12. The synchronous mode provides the user of extremely critical, reliable data a way to ensure that data written to the disk synchronously on the primary computer system 12 is stored on the secondary computer system 14 before the primary is allowed to continue with its operations. Many banking and billing systems fall into this category. UFS on UNIX is not reliable in this sense. It delays writes to the disk to improve performance. Thus, it operates in a very asynchronous manner. Given some of the constraints and limitations of the UFS implementation in Solaris 2.X, it is necessary to process UFS asynchronous writes asynchronously, as if in the asynchronous mode. In addition, the synchronous mode increases latency to disk of metadata. This has the effect of decreasing the performance of UFS file systems mounted on a local data storage unit 26 in the synchronous mode. For these reasons, it is not appropriate to use the synchronous mode on a UFS file system. On the other hand, in one exemplary implementation, VxFS file systems honor the synchronous mode if mounted with a command –0mincache=dsync.

In another alternative, the computer network remote data mirroring system 10 can be configured in the near synchronous mode. The near synchronous mode is a middle ground between asynchronous and synchronous mode behaviors. In the near synchronous mode, data updates are allowed to accumulate in the writelog device 18 asynchronously until a tunable number of data entries has accumulated, at which time I/O operations by the application are blocked until the number of entries in the writelog device falls below this tunable limit. The near synchronous mode reduces the performance penalty found in the synchronous mode, yet adds confidence that the data on the mirror device 32 on the secondary computer system 14 is no more than n disk updates behind the primary computer system 12. The near synchronous mode is a relaxation of the synchronous mode to allow up to n data updates to accumulate in the writelog device 18 asynchronously before blocking application I/O until the writelog device empties to below n entries.

In the exemplary implementation, the computer network remote data mirroring system 10 has various additional operating modes. These are described below. Most of the following modes are not exclusive. That is, the computer network remote data mirroring system 10 may operate in one or more of these modes concurrently.

A setup mode is the default mode for the computer network remote data mirroring system 10 when the software is installed. The setup mode indicates that the local data storage unit 26 has not been created and the computer network remote data mirroring system 10 is not in operation. It is in this mode that configuration files are created before running add_drv qds (which establishes the local data storage unit 26). The primary mirror daemon 24 and remote mirror daemon 30 are not running in this mode.

In an accumulating mode, the computer network remote data mirroring system 10 is installed with reads and writes directed to the local data storage unit 26. Modifications to local data are being journaled to the writelog device 18, but the primary mirror daemon 24 is not active and is not removing these. The accumulating mode may be the result of a failed network connection or explicit halting of the primary mirror daemon 24 (killpmds). In this mode, the writelog device 18 continues to fill while entries are not being removed. This eventually causes the writelog device 18 to overflow. If a logical group 34 is configured for the synchronous mode or the near synchronous mode, having the logical group in accumulating mode will block I/O updates from the applications.

A connected mode indicates that the software which comprises the computer network remote data mirroring system 10 is installed, read/write requests are being handled by the local data storage unit 26, and data updates are being transferred to the mirror device 32 on the secondary computer system 14 through the primary mirror daemon 24 and the remote mirror daemon 30. Modifications to local data are being journaled to the writelog device 18, and the primary mirror daemon 24 is actively transferring entries from the writelog device 18 to the remote mirror daemon 30 on the secondary computer system 14. The remote mirror daemon 30 commits the data received from the network connection 10 the mirror device 32 on the secondary computer system. This is the operational mode in which remote data mirroring is accomplished and in which ongoing mirroring and a coherent copy of data exists on the secondary computer system 14.

The computer network remote data mirroring system 10 is placed into a bypass mode by entering qdsbypass with the required arguments or automatically when a writelog device overflow occurs. When the computer network remote data mirroring system 10 is in the bypass mode, the software which comprises the computer network remote data mirroring system is installed, and reads/writes are being done to the local data storage unit 26, but the device driver 22 is reading from and writing to the local data device 16 only. No journaling of data modifications is being done to the writelog device 18. Updates are not being transferred to the secondary computer system 14. The bypass mode is the operating state into which a local data storage unit 26 moves automatically when a writelog device 18 fills up and overflows. Moving into the bypass-mode results in the secondary computer system 14 being out of synchronization with the primary computer system 12 and requires a refresh operation to re-establish synchronization between the two systems A refresh mode is a background operation used to create an initial mirror or to synchronize the secondary computer system 14 with the primary computer system 12. The computer network remote data mirroring system 10 is placed in the refresh mode by typing launchrefresh with the required arguments. A refresh causes every sector on the local data storage unit 26 to be moved across to the secondary computer system 14 by reading from the local data device 16 and writing the sectors to the writelog device 18. This can be performed while other I/O activity is being processed by the local data storage unit 26 as well. The refresh mode is halted automatically when the refresh process is complete and normal operation commences. While the computer network remote data mirroring system 10 is in the refresh mode, the data on the secondary computer system 14 is in an incoherent state. The data on the secondary computer system 14 preferably cannot be used if a failure occurs during the refresh process. Coherency is achieved only after the refresh is complete. For this reason, it may be necessary to back up the secondary computer system 14 before placing the computer network remote data mirroring system 10 in the refresh mode.

A backfresh mode is an operation used to synchronize the primary computer system 12 from the secondary computer system 14. A backfresh operation causes all the sectors of the mirror device 32 to be moved across the network 20 to the corresponding local data device 16. The primary mirror daemon 24 is placed into the backfresh mode by issuing a launchbackfresh command with the required arguments. Once in the backfresh mode, the primary mirror daemon 24 requests mirror device sectors from the remote mirror daemon 30 and writes the returned sectors to the local data device 16 for all target data devices. When the backfresh operation completes, the primary mirror daemon 24 is automatically restored to the state it was in, typically the connected mode or the accumulating mode, before the launchbackfresh command was issued. While the backfresh operation is running, the local data device 16 is considered off-line to applications, because the backfresh operation requires exclusive access to the local data device 16. While in the backfresh mode, the data on the local data device 16 is in an incoherent state. The data preferably cannot be used if a failure occurs during the backfresh operation. Coherency is achieved only after the backfresh operation is complete.

During normal operation, the primary mirror daemon 24 fetches a large block of entries from the writelog device 18 at one time and sends the data entries, one at a time, across the network 20 to the remote mirror daemon 30. The advantage of having the primary mirror daemon 24 obtain a number of data entries at once is that this reduces disk head contention in the embodiment in which the writelog device 18 comprises a disk drive device, instead of moving the disk head back and forth between the head and the tail of the writelog device, which slows down application performance. If there are only one or two data entries in the writelog device 18, this read by the primary mirror daemon 24 is satisfied entirely out of the in-memory cache of the device driver 22, and no actual disk reads occur. The data entries in the writelog device 18 remain in the writelog device until the primary mirror daemon 24 receives an acknowledgement for the data entries from the remote mirror daemon 30, meaning they have been committed to the mirror device 32. When this occurs, the primary mirror daemon 24 informs the device driver 22 to advance the tail pointer of the writelog device 18, and that space used by the transmitted mirrored entries may be reused.

The writelog device 18 maintains metadata describing where the head and the tail are located on the disk in the embodiment in which the writelog device comprises a disk drive device. This is actually an informed, but normally out-of-date guess. The primary mirror daemon 24 periodically requests that the device driver 22 update this metadata with the current values based on either a tunable timeout being reached or after m data entries have been sent to the remote mirror daemon 30, whichever is encountered first. During the startup/recovery time of the computer network remote data mirroring system 10, a qdswlscan utility uses these head and tail locations as a starting point to scan the writelog device 18 and locate the actual head and tail locations. Maintaining a recent location of head and tail in this metadata area reduces the time required for this scan to complete. Timestamps and sequence numbers are used in evaluating which data entries actually constitute the head and tail of the writelog device 18.

It is important to note that the data from an update is written to both the local data device 16 and the writelog device 18. One perception might be that this is inefficient from a storage standpoint, that is, the data resides on another disk on the system, rather than simply using offset and length in the writelog device entry header when the time arrives to read an entry and transmit it across the network 20. This brings out a design feature of the computer network remote data mirroring system 10, namely, chronological coherency of data. Chronological coherency means that the mirror device 32 on the secondary computer system 14 not only receives all data from updates on the primary computer system 12, but that the mirror device always is in a usable state and contains a faithful copy of the data set up to a particular instant in time.

At any given moment, the writelog device 18 may contain tens or hundreds of updates awaiting transmission. If one were to simply use the offset and length stored in the entry header in the writelog device 18 to read data from the local data device 16, one may instead be fetching data that was modified after the transaction of interest. This means that one is sending "out of order" data, meaning the mirror device 32 has information that is most probably unusable. FIG. 11 shows the consequence of using offsets and lengths to read the entry from the data disk device as compared to storing a copy of the data in the writelog device 18.

In the case in which the computer network remote data mirroring system 10 is configured with one or more logical groups 34, when the master primary mirror daemon 24 begins execution, it looks for logical group configuration files in /etc/opt/QLIXds. For each logical group configuration file it finds that is defined for the current system in a primary role, it creates a child process for that logical group 34. After all child processes have been created, the master primary mirror daemon process waits for any child process terminations. The master primary mirror daemon 24 will determine the cause of the child process termination and will relaunch the child if the cause was due to a recoverable error, such as a loss of the network link.

The child primary mirror daemon process concerns itself only with the logical group configuration file that it was given by the master primary mirror daemon 24. It reads this file, creates the necessary data structures, verifies the configured devices, then attempts to create a connection to the secondary computer system 14. This connection is made to a master remote mirror daemon process on the secondary computer system 14. Once the master remote mirror daemon 30 receives a connection, it creates a child remote mirror daemon process, which in turn creates a private channel of network communications with the primary mirror daemon process. The child primary mirror daemon 24A, 24B sends an authentication handshake to the child remote mirror daemon 30A, 30B. This handshake tells the child remote mirror daemon process which configuration file is used for the logical group 34 and sends a cipher that uniquely identifies the primary computer system 12. The child remote mirror daemon 30A, 30B uses its own copy of the configuration file and various system information to verify the identity of the primary computer system 12 and either continues if this is an appropriate connection or terminates if the primary computer system is not authorized to make the connection. The child primary mirror daemon 24A, 24B then sends a mapping for each local data storage unit 26 it has in its configuration file to the child remote mirror daemon process. The child remote mirror daemon 30A, 3GB verifies the local data storage unit 26 mapping against its configuration file and returns either an acknowledgment (ACK) message and the next expected sequence number for the device or an error (ERR) message on configuration mismatch and then terminates. Once all mappings are in place, the child primary mirror daemon 24A, 24B creates and fills internal buffers with data entries from the associated writelog devices 18. These data entries are sent according to their global sequence number ordering, ensuring that chronological coherency is maintained between the member local data storage units 26 of the logical group 34. When the last data entry of the internal buffer for a local data storage unit 26 is being prepared to be sent, a flag is set in the header requesting an acknowledgment from the child remote mirror daemon 30A, 3GB once the data of the entry has been committed to the mirror device 32. This process keeps the protocol overhead thin in that each data entry transferred does not require an explicit ACK message from the child remote mirror daemon 30A, 30B. Once this ACK message has been received from the child remote mirror daemon process, the child primary mirror daemon 24A, 24B has the device driver 22 advance the tail of the writelog device 18 over all of the committed data entries.

The child primary mirror daemons 24A, 24B periodically update a performance tracking file located in /var/opt/QLIXds with the same name as the configuration file (e.g., dsgrp000.prf). This file is ASCII and has a row/column layout. Each row corresponds to the time of the last update of the performance file. New data entries are added to the end of these files.

A number of performance metrics are issued for each local data storage unit 26 since the last update. These performance metrics preferably include the total KB per second (header plus data) sent to the secondary computer system 14; the data KB per second sent to the secondary computer system; the data entries per second sent to the secondary computer system; the number of data entries in the writelog device 18 awaiting transfer; the number of disk sectors in use in the writelog device in the embodiment in which the writelog device comprises a disk drive device; the percent of the writelog device in use; and the age of the oldest data entry in the writelog device in seconds. These performance files are allowed to grow to a configurable limit. In one exemplary implementation, the configurable limit has a default of 64 KB. One previous generation of these performance files is retained. In the exemplary implementation, a graphical utility program qdsperftool, is provided to instantly view any of this performance information in real-time, presentation quality, configurable charts.

Figure 12:
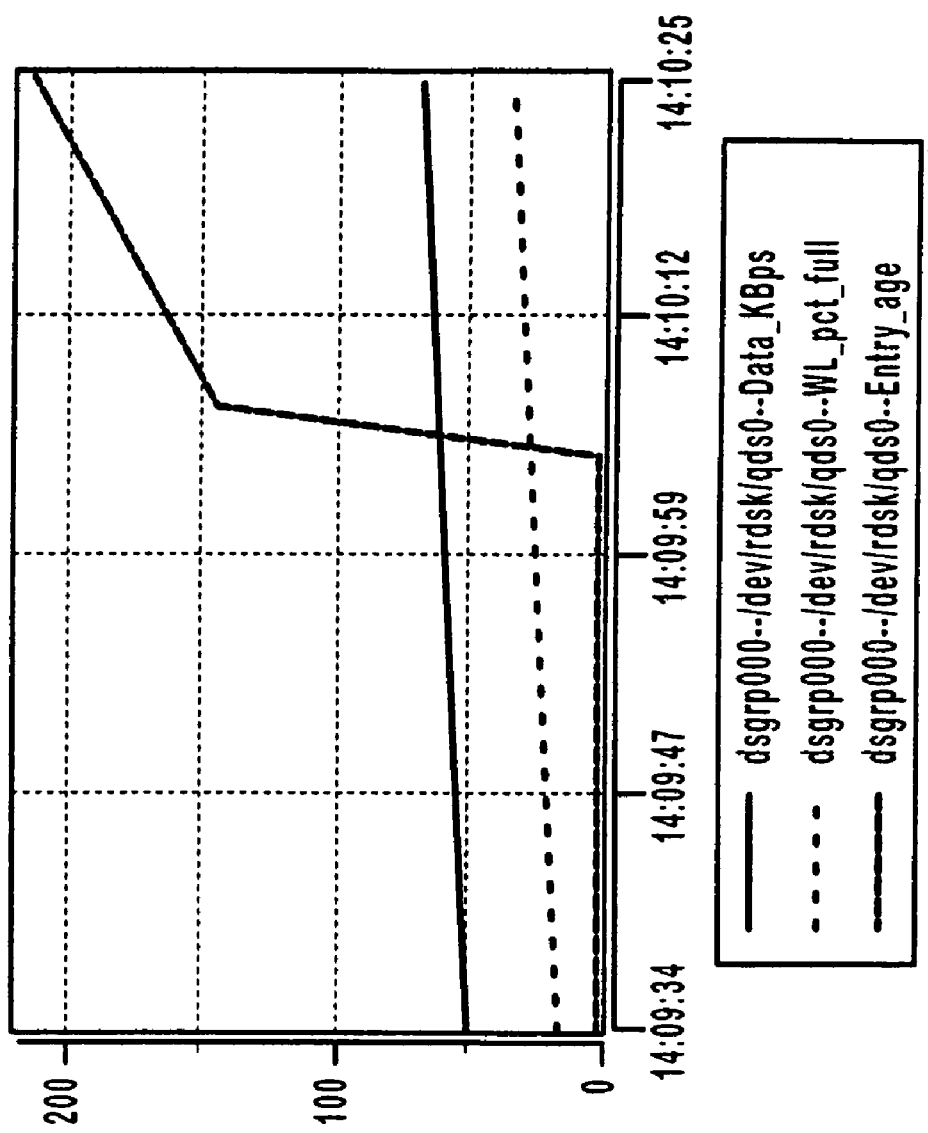
FIG. 12 is an example of a qdsperftool chart.

Finally, the exemplary implementation of the computer network remote data mirroring system 10 includes utility commands. The following describes various utility commands to manage the computer network remote data mirroring system 10 environment.

qdswlinit is a utility command to initialize one or more writelog devices 18 to show it empty and available for use. This is preferably done prior to the first use of a writelog device 18.

qd3wlscan is a utility command to associate and register with the device driver 22, for one or more local data storage units 26, the writelog device 18 and its corresponding local data device 16. This command also informs the device driver 22 of writelog device extensions, sequence numbers, and the head and tail of the writelog device 18. This is a required activity prior to using the local data storage unit 26.

qdsbypass is a utility command which turns off or on the bypass mode for one or more local data storage units 26. When in the bypass mode, updates are not added to the writelog device 18. When in the bypass mode, the mirror is broken, as data updates are not be transferred to the secondary computer system 14. However, these data updates will modify the local data device 16. A writelog device overflow during run time preferably causes the primary mirror daemon 24 to automatically place all local data storage units 26 in the logical group 34 into the bypass mode.

qdsrefresh is a utility command for one or more local data storage units 26, which copies all disk blocks sequentially from the local data device 16 to the writelog device 18, and then over the network 20 to the mirror device 32 of the secondary computer system 14. This command is used to create an initial mirror of data on the secondary computer system 14 or to refresh the secondary after a writelog device overflow. This utility will not overflow the writelog device 18, as it constantly monitors the availability of writelog device resources. Normal I/O can take place to the local data storage unit 26 when qdsrefresh is running without threat of data loss or corruption. It is noted that during a qdsrefresh cycle, the mirror device 32 is placed into an incoherent state and is not usable should the network 20 or primary computer system 12 go out of service during the process.

qdsinfo is a utility command which prints out the state and metrics for one or more writelogs 18 by interrogating the device driver 22. This utility is executed only on the primary computer system 12. The qdsinfo command generates an ASCII report for one or more local data storage units 26 from the perspective of the device driver 22 and the writelog device 18. The qdsinfo command indicates if the writelog device 18 has been placed in a special mode, for example, the bypass mode or the refresh mode. It also shows performance metrics specific to the writelog device 18.

qdsconfigtool is a graphical user interface utility for viewing, editing, or defining logical group configuration files, including primary and secondary computer systems 12, 14, tunable primary mirror daemon parameters, writelog device extension pools 18A, local data storage units 26, and throttles.

qdsperftool is a graphical real-time charting tool for displaying performance data for the computer network remote data mirroring system 10. The user employs qdsperftool to display charts of various performance metrics of the computer network remote data mirroring system 10. For example, FIG. 12 illustrates a chart generated by qdsperftool. Additionally, the user can display multiple charts at one time, modify the charts, delete them, or print them. qdsperftool enables the user to observe performance of the computer network remote data mirroring system 10 over time and shows trends.

qdsmonitortool is a utility that provides a comprehensive picture of activity and state information for the computer network remote data mirroring system 10. This utility is executed only on the primary computer system 12. qdsmonitortool is a graphical user interface utility that shows in a single window the following areas of interest: a status message area; error messages and warnings from the monitored primary computer system 12 and all secondary computer systems 14 associated with the primary computer system; logical groups 34 and their states; the state of the primary mirror daemon 24 and the state of the secondary mirror daemon 30; local data storage units 26, their states, and their activity modes; writelog device states and usages; and a notification control panel and update scheduler.

qdsdevinfo is a convenience utility that returns the major/minor numbers for any disk device and the size of the device in sectors (used by qdsconfigtool).

qdshostinfo is a convenience utility that returns the networked hostnames and IP addresses for a computer system. qdshostinfo also returns the host identification if executed on the computer system in question (used by qdsconfigtool).

qdsrmdreco is a recovery utility for the secondary computer system 14, that commits any buffered data entries to the mirror device 32.

launchpmds, launchrmds, and launchrefresh are shell scripts that are the preferred way to start the primary and secondary mirror daemons 24, 30. These shell scripts perform sanity checks before running the daemons 24, 30, and run the daemons under a corruption so that they will not terminate when the parent window is closed.

killpmds, killrmds, and killfresh are shell scripts that conveniently terminate all daemon instances.

Finally, in.pmd and in.rmd are utility commands to render the primary mirror daemon 24 executable and the remote mirror daemon 30 executable, respectively. A4

In accordance with the foregoing description, the computer network remote data mirroring system 10 enhances a disaster recovery operation by maintaining up-to-date copies of the disk storage at a remote recovery site. Also, by using a second copy and a different server, the business-critical resource at the primary on-line location can be kept available during a required backup process. Accordingly, the system downtime needed for backup processing can be reduced. Additionally, when moving a data center to a new location or upgrading equipment at an existing site, the computer network remote data mirroring system 10 may be used to keep the primary system on-line while data is being migrated.

The computer network remote data mirroring system 10 is implemented both locally and remotely and is also particularly useful when it is incorporated into a server fail-over computer system. A server fail-over system addresses the problem of a system CPU which goes out of service, as compared to a disk going out of service. Such a server fail-over system is described in commonly-owned co-pending U.S. patent application Series Code/Ser. No. 08/966,633, entitled "SERVER FAIL-OVER SYSTEM," filed on Nov. 10, 1997, which is incorporated in its entirety herein by this reference.

In summary, the computer network remote data mirroring system 10 provides high-performance continuous data protection for networked computer systems, such as UNIX-based computer Systems. The computer network remote data mirroring system 10 is compatible with many storage devices, file systems, and volume managers. The computer network remote data mirroring system 10 provides continuous network data mirroring and provides coherent data replication while ensuring fast application response time without risking application availability. The computer network remote data mirroring system 10 is preferably configured to automatically recover from failures to the primary computer system 12, secondary computer system 14, and network 20. The computer network remote data mirroring system 10 comprises an intuitive graphical user interface to ensure ease of configuration and dynamic control features to provide management of network resources, while throttles enable triggered events to help proactively manage the overall process. Nevertheless, the computer network remote data mirroring system 10 has low system overhead.

Snapshot and continuous monitoring tools give the user instant insight into the status of data protection and the way the system and network resources are being used. Performance monitoring provides the user a timeline view of the operation in a graphical format.

In the foregoing specification, the present invention has been described with reference to specific embodiments thereof. It will, however, be evident that various modifications and changes may be made thereto without departing from the broader spirit and scope of the invention. One contemplated modification is to provide secondary journaling to enable checkpointing of mirrored data during active data updates, as well as to provide an additional integrity mechanism during incoherent data transfer periods (e.g., during synchronizations after overflows in the embodiment in which the writelog device 18 of the computer network remote data mirroring system 10 comprises a memory and dirty bit map disk). Another contemplated modification is optimization for high data rate throughput over the network 20. This includes: continuous data streaming, simple compression of data streams, banding of multiple physical networks into a logical connection with additive bandwidth increases, and smart synchronization of primary and secondary data sets. Continuous network data streaming would yield data transfer rates approaching the maximum observable rates only seen with high performance networks (comparable to ftp speeds). User activation of data compression may make the effective network data transfer rates exceed any other LAN-based network transfer mechanisms. Optional multi-network banding would allow network bandwidth to be added to a network connection by specifying multiple physical network paths between primary and secondary systems. Smart data synchronization (refresh and backfresh) would transfer only changed data between primary and secondary sites, tremendously reducing synchronization times. One contemplated change is that throttle evaluation and performance data collection can be separated from the primary and secondary mirror daemons 24, 30 and placed in a separate daemon executed on the primary and secondary computer systems 12, 14.

Furthermore, while one exemplary implementation has been described with respect to a Solaris 2.X environment, the invention is also applicable to other operating environments, such as Microsoft Windows environments. In this regard, the principles of the present invention apply to Octopus Datastar real-time data protection software for Windows NT networks and OctopusDP real-time data protection software for Windows 95 and Windows NT networks, both of which are commercially available from Qualix Group, Inc., located in San Mateo, Calif., and which are hereby incorporated herein in their entirety by this reference. The specification and drawings are, accordingly, to be regarded in an illustrative rather than in a restrictive sense. The present invention should not be construed as limited by illustrated embodiments and examples, but rather construed according to the following claims.

What is claimed and desired to be secured by United States Letters Patent is:

1. A method of mirroring data, comprising:
   receiving a sequence of data updates; and
   writing each update to a journal storage in a manner that preserves the place of each data update within the sequence;
   wherein the journal storage is included in a redundant data storage device and the journal storage is configured to store concurrently two or more data updates and each update remains in the journal storage until an acknowledgement is received that confirms that the data update was committed to a mirror.

2. A method as recited in claim 1, further comprising receiving an indication that the journal storage is or is about to become full with previously-stored updates that are still required to be retained; and dynamically allocating additional storage locations to the journal storage.

3. A method as recited in claim 1, wherein the redundant data storage device is redundant of a primary local data storage with which the data updates are associated.

4. A method as recited in claim 1, further comprising returning control to an application or other process from which a particular data update was received only after that data update has been written to both the primary local data storage and the journal storage.

5. A method as recited in claim 1, wherein writing an update to the journal storage comprises writing the update to a journal cache and subsequently reading the update from the cache and writing the update to a journal storage location on disk.

6. A method as recited in claim 1, further comprising allowing no more than a prescribed number of updates to accumulate in the journal storage.

7. A method as recited in claim 6, wherein allowing no more than a prescribed number of updates to accumulate in the journal storage includes sending one or more updates across a network to a remote mirror location and deleting the one or more updates from the journal storage once confirmation is received that the updates were received and incorporated successfully at the remote mirror location.

8. A method as recited in claim 6, wherein the prescribed number is configurable.

9. A method as recited in claim 1, further comprising retrieving as a group a plurality of updates stored in the journal storage and sending the retrieved updates one-by-one, in the sequence in which they were written into the journal storage, to a remote mirror location.

10. A computer program product for mirroring data, the computer program product being embodied in a computer readable medium and comprising computer instructions for:

receiving a sequence of data updates; and writing each update to a journal storage in a manner that preserves the place of each data update within the sequence;

wherein the journal storage is included in a redundant data storage device and the journal storage is configured to store concurrently two or more data updates and each update remains in the journal storage until an acknowledgement is received that confirms that the data update was committed to a mirror.

11. A computer program product as in claim 10, further comprising computer instructions for receiving an indication that the journal storage is or is about to become full with previously-stored updates that are still required to be retained; and dynamically allocating additional storage locations to the journal storage.

12. A computer program product as in claim 10, further comprising computer instructions for returning control to an application or other process from which a particular data update was received only after that data update has been written to both the primary local data storage and the journal storage.

13. A computer program product as in claim 10, further comprising computer instructions for allowing no more than a prescribed number of updates to accumulate in the journal storage.

14. A computer program product as in claim 10, wherein writing an update to the journal storage comprises writing the update to a journal cache and subsequently reading the update from the cache and writing the update to a journal storage location on disk.

15. A computer program product as in claim 10, further comprising computer instructions for retrieving as a group a plurality of updates stored in the journal storage and sending the retrieved updates one-by-one, in the sequence in which they were written into the journal storage, to a remote mirror location.

16. The method of claim 1 wherein the redundant data storage device is a disk drive.

17. A system, comprising:

a processor;

an interface configured to receive a sequence of data updates; and a journal storage, included in a redundant data storage;

wherein the journal storage is configured to store concurrently two or more data updates in a manner that preserves the place of each data update within the sequence, and wherein the journal storage is configured such that each update remains in the journal storage until an acknowledgement is received that confirms that the data update was committed to a mirror.

18. The system of claim 17, wherein the processor is configured to cause the receipt of an indication that the journal storage is or is about to become full with previously-stored updates that are still required to be retained; and in response cause the dynamic allocation of additional storage locations to the journal storage.

19. The system of claim 17, wherein the redundant data storage device is redundant of a primary local data storage with which the data updates are associated.

20. The system of claim 17, wherein the processor is configured to cause the return of control to an application or other process from which a particular data update was received only after that data update has been written to both the primary local data storage and the journal storage.

21. The system of claim 17, wherein writing an update to the journal storage comprises writing the update to a journal cache and subsequently reading the update from the cache and writing the update to a journal storage location on disk.

* * * * *